(12) United States Patent
Sano

(10) Patent No.: US 7,097,892 B2
(45) Date of Patent: *Aug. 29, 2006

(54) PRESSURE-SENSITIVE ADHESIVE TAPE OR SHEET, AND METHOD FOR PRODUCING IT

(75) Inventor: Masanori Sano, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 65 days.

This patent is subject to a terminal disclaimer.

(21) Appl. No.: 10/825,241

(22) Filed: Apr. 16, 2004

(65) Prior Publication Data

US 2004/0213942 A1 Oct. 28, 2004

(30) Foreign Application Priority Data

Apr. 25, 2003 (JP) ............................ P.2003-121637
Apr. 30, 2003 (JP) ............................ P.2003-125043
Feb. 26, 2004 (JP) ............................ P.2004-051509

(51) Int. Cl.
*B32B 9/00* (2006.01)

(52) U.S. Cl. .................. 428/40.1; 428/40.2; 428/41.7; 428/41.8; 428/42.1; 428/119; 428/120

(58) Field of Classification Search ............... 428/40.1, 428/40.2, 41.7, 41.8, 42.1, 119, 120
See application file for complete search history.

(56) References Cited

U.S. PATENT DOCUMENTS 3,214,502 A 10/1965 Schaar
3,922,410 A * 11/1975 Halloran ..................... 428/88
6,045,858 A 4/2000 Hamano
6,228,485 B1 5/2001 Leiter
2004/0219336 A1* 11/2004 Sano ....................... 428/195.1

FOREIGN PATENT DOCUMENTS

AU 64249/86 A 1/1987
EP 0 448 955 A2 10/1991
EP 1 473 345 A1 11/2004
WO WO 03/002681 A1 1/2003

OTHER PUBLICATIONS

European Search Report dated Nov. 10, 2004.
Patent Abstracts of Japan (2002), vol. 2002, No. 8, Pub. No. 2002-121503, published Apr. 26, 2002.

* cited by examiner

*Primary Examiner*—Nasser Ahmad
(74) *Attorney, Agent, or Firm*—Sughrue Mion, PLLC

(57) ABSTRACT

A pressure-sensitive adhesive tape or sheet having a pressure-sensitive adhesive layer formed on at least one surface of the support thereof, wherein the surface of the pressure-sensitive adhesive layer on at least one surface of the support partly has projected spots of fibers. The projected spots of fibers are preferably raised spots of fibers that are raised from the surface of the pressure-sensitive adhesive layer. The pressure-sensitive adhesive tape or sheet is favorable for flooring material fixation. The pressure-sensitive adhesive tape or sheet is produced according to a flocking method that comprises flocking the surface of the pressure-sensitive adhesive layer on at least one surface of the support to thereby form projected spots of fibers partly in the surface of the pressure-sensitive adhesive layer.

9 Claims, 12 Drawing Sheets

PARTLY-ENLARGED, SCHEMATIC CROSS-SECTIONAL VIEW

PRESSURE-SENSITIVE ADHESIVE TAPE OR SHEET, AND METHOD FOR PRODUCING IT

FIELD OF THE INVENTION

The present invention relates to a pressure-sensitive adhesive tape or sheet, and a method for producing it. More precisely, the invention relates to a pressure-sensitive adhesive tape or sheet that exhibits good reworkability and repositionability in adhering adherends with it, and to a method for producing it.

The invention also relates to a releasable substrate for use in producing a pressure-sensitive adhesive tape or sheet that exhibits good reworkability and repositionability in adhering adherends with it, to a pressure-sensitive adhesive tape or sheet produced by using the releasable substrate, and to a method for producing it.

BACKGROUND OF THE INVENTION

When applied to various adherends, pressure-sensitive adhesive tapes or sheets must readily and firmly adhere to predetermined positions of the adherends. For this purpose, pressure-sensitive adhesive tapes or sheets are required to have good reworkability (they can be temporarily fixed on adherends and can be re-attached to them) and good repositionability (they can be re-positioned on adherends). For example, regarding the operation of applying a pressure-sensitive adhesive tape or sheet to a predetermined site, there is mentioned one example of adhering a flooring material to a floor base. In the operation of adhering a flooring material to a floor base, the flooring material must be inserted into a predetermined area on a floor base. For this purpose, the flooring material, after having been inserted into a predetermined area on a floor base, must be moved for a relatively long distance along the floor base. In this operation, when a pressure-sensitive adhesive tape or sheet having a pressure-sensitive adhesive layer of an ordinary pressure-sensitive adhesive is used, then the flooring material could not be moved along the floor base after it has been inserted into a predetermined area on it, because of the tackiness and the initial adhesiveness of the pressure-sensitive adhesive. To solve the problem, various methods have been proposed. One comprises using a pressure-sensitive adhesive tape or sheet of which the pressure-sensitive adhesive force is temporarily lowered by the use of water or an organic solvent, or comprises disposing water-swollen granules of a water-absorbing polymer in the interface between the surface of a pressure-sensitive adhesive layer and an adherend (see Patent Reference 1); another comprises using a pressure-sensitive adhesive tape or sheet of which the pressure-sensitive adhesive layer is specifically so designed that its surface has an uneven structure to thereby lower the initial adhesive area thereof (see Patent Reference 2); and still another comprises using a pressure-sensitive adhesive tape or sheet of which the pressure-sensitive adhesive layer is spotted with projections of a non-tacky solid substance to thereby control the initial adhesive force thereof (see Patent Reference 3).

[Patent Reference 1] Japanese Patent No. 3296769

[Patent Reference 2] JP-A-2002-121503

[Patent Reference 3] JP-A-7-310057

In the method of disposing water-swollen granules of a water-absorbing polymer in the interface between the surface of a pressure-sensitive adhesive layer and an adherend, for example, as in Japanese Patent No. 3296769, water is used. However, since water essentially retards adhesion, and using it is undesirable in view of the reliability of adhesion.

In the method of using a pressure-sensitive adhesive tape or sheet of which the pressure-sensitive adhesive layer is specifically so designed that its surface has an uneven structure to thereby lower the initial adhesive area thereof, for example, as in JP-A-2002-121503 (The term "JP-A" as used herein means an "unexamined published Japanese patent application"), the surface of the pressure-sensitive adhesive tape or sheet has a pressure-sensitive adhesive layer existing thereon. In the method, therefore, the width of the correctable position from the temporarily-fixed position is limited, and the repositionability of the pressure-sensitive adhesive tape or sheet is unsatisfactory.

In the method of using a pressure-sensitive adhesive tape or sheet of which the pressure-sensitive adhesive layer is spotted with projections of a non-tacky solid substance to thereby control the initial adhesive force thereof, for example, as in JP-A-7-310057, the non-tacky substance is merely attached to the surface of the pressure-sensitive adhesive layer and its structure is not controlled. Therefore, for making the pressure-sensitive adhesive tape or sheet exhibit good repositionability, the amount of the non-tacky substance to be applied thereto inevitably increases, which, however, is undesirable in view of the pressure-sensitive adhesion characteristics of the tape or sheet.

SUMMARY OF THE INVENTION

Accordingly, an object of the present invention is to provide a pressure-sensitive adhesive tape or sheet of good reworkability and repositionability, and to provide a method for producing it.

Another object of the invention is to provide a pressure-sensitive adhesive tape or sheet useful for flooring material fixation, and to provide a method for producing it.

Accordingly, still another object of the invention is to provide a releasable substrate for use in producing pressure-sensitive adhesive tapes or sheets of good reworkability and repositionability, to provide a pressure-sensitive adhesive tape or sheet obtained by the use of the releasable substrate, and to provide a method for producing it.

Still another object of the invention is to provide a releasable substrate for use in producing pressure-sensitive adhesive tapes or sheets useful for flooring material fixation, to provide a pressure-sensitive adhesive tape or sheet obtained by the use of the releasable substrate, and to provide a method for producing it.

The present inventor has assiduously studied to attain the above objects and, as a result, has found that, when specific structure parts of fibers are provided in the surface of the pressure-sensitive adhesive layer of a pressure-sensitive adhesive tape or sheet, then the tape or sheet may be well temporarily fitted to an adherend and can be re-attached to it when it is adhered to a predetermined site of the adherend, and, in addition, it can be readily re-positioned on the adherend. The present invention has been completed on the basis of these findings.

Specifically, the invention is a pressure-sensitive adhesive tape or sheet having a pressure-sensitive adhesive layer formed on at least one surface of the support thereof, wherein the surface of the pressure-sensitive adhesive layer on at least one surface of the support partly has projected spots of fibers.

Preferably, the projected spots of fibers are raised spots of fibers that are raised from the surface of the pressure-sensitive adhesive layer. The surface of the projected spots of fibers of the pressure-sensitive adhesive layer may be protected with a releasable liner that has recesses (especially, perforations) at the sites of the surface thereof corresponding to the projected spots of fibers of the pressure-sensitive adhesive layer. The projected spots of fibers of the surface of the pressure-sensitive adhesive layer may be provided to have a predetermined pattern as a whole.

Preferably, in the invention, the support is a substrate for pressure-sensitive adhesive tape or sheet, a pressure-sensitive adhesive layer is formed on both surfaces of the substrate, and projected spots of fibers are formed in the surface of the pressure-sensitive adhesive layer on one surface of the substrate. Also preferably, the area in which the projected spots of fibers are provided in the surface of the pressure-sensitive adhesive layer is in a ratio of from 0.001 to 20% of all the surface area of the pressure-sensitive adhesive layer. The length of the fibers to constitute the projected spots may be from 0.1 to 5 mm, and the thickness thereof may be from 0.1 to 20 deniers.

The pressure-sensitive adhesive tape or sheet is favorably used for flooring material fixation.

The invention also provides a method for producing the pressure-sensitive adhesive tape or sheet, which comprises flocking the surface of a pressure-sensitive adhesive layer on at least one surface of a support to form projected spots of fibers partly in the surface of the pressure-sensitive adhesive layer, according to a flocking method. In the production method, it is desirable that a releasable liner having holes is put on the surface of the pressure-sensitive adhesive layer, and the surface of the pressure-sensitive adhesive layer is flocked in that condition to thereby form the intended projected spots of fibers in the sites of the surface of the pressure-sensitive adhesive layer corresponding to the holes of the releasable liner.

The present inventor has further studied to attain the above objects and, as a result, has found that, when specific structure parts of fibers are provided in the surface of the pressure-sensitive adhesive layer of a pressure-sensitive adhesive tape or sheet, then the tape or sheet may be well temporarily fitted to an adherend and can be re-attached to it when it is adhered to a predetermined site of the adherend, and, in addition, it can be readily re-positioned on the adherend. In addition, it has further been found that the pressure-sensitive adhesive tape or sheet (having the specific structure parts of fibers in the surface of the pressure-sensitive adhesive layer thereof) can be readily produced by the use of a releasable substrate having a specific structure. The present invention has been completed on the basis of these findings.

Specifically, the invention provides a releasable substrate of which at least one surface is a release face relative to a pressure-sensitive adhesive face and has holes, wherein the peripheral region around the holes is thickened, as swelling toward the side of one face alone.

Preferably, the releasable substrate is formed of a plastic substrate. Also preferably, the holes are formed by perforating the substrate. The temperature for perforation may be lower than the melting point of the plastic substrate and not lower than a temperature of (melting point −30° C.).

The releasable substrate of the type may be used in producing a pressure-sensitive adhesive tape or sheet that comprises a support, a pressure-sensitive adhesive layer formed on at least one surface of the support, and projected spots of fibers formed partly in the surface of the pressure-sensitive adhesive layer on at least one surface of the support, and it is desirable that the holes are formed in the sites corresponding to the projected spots of fibers to be formed in the surface of the pressure-sensitive adhesive layer.

The invention also provides a pressure-sensitive adhesive tape or sheet having a pressure-sensitive adhesive layer formed on at least one surface of the support thereof, and having projected spots of fibers formed partly in the surface of the pressure-sensitive adhesive layer on at least one surface of the support, which is produced by the use of the releasable substrate. Preferably, the projected spots of fibers of the pressure-sensitive adhesive tape or sheet are raised spots of fibers that are raised from the surface of the pressure-sensitive adhesive layer. Also preferably, the projected spots of fibers of the surface of the pressure-sensitive adhesive layer are so designed that they have a predetermined pattern as a whole.

The invention also provides a method for producing the pressure-sensitive adhesive tape or sheet, which comprises putting the releasable substrate on a pressure-sensitive adhesive layer in such a manner that its flat face not having the swollen parts is in contact with the surface of the pressure-sensitive adhesive layer and flocking the surface of the pressure-sensitive adhesive layer in that condition to thereby form the intended projected spots of fibers in the sites of the surface of the pressure-sensitive adhesive layer corresponding to the holes of the releasable substrate.

BRIEF DESCRIPTION OF THE DRAWINGS

FIG. 1A is a schematic plan view of the pressure-sensitive adhesive tape or sheet seen on its top; and FIG. 1B is a schematic cross-sectional view of FIG. 1A cut along the X-Y line.

FIG. 9A is a cross-sectional view of the substrate, and FIG. 9B is a plan view thereof seen on the top face where the peripheral region around the holes swells to its side.

FIG. 14A is a schematic plan view of the pressure-sensitive adhesive tape or sheet seen on its top, and FIG. 14B is a schematic cross-sectional view of FIG. 14A cut along the line X'-Y'.

DESCRIPTION OF NUMERAL REFERENCES

Figure 1A:
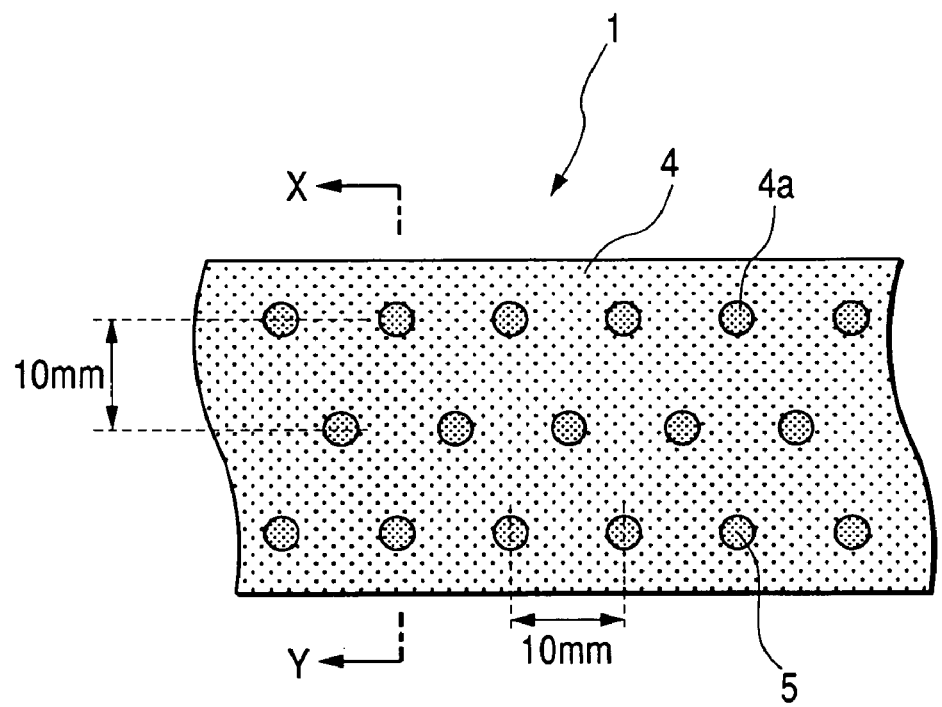
FIGS. 1A and 1B are schematic views partly showing one example of the pressure-sensitive adhesive tape or sheet of the invention.

1 Pressure-sensitive adhesive tape or sheet
1a Roll of pressure-sensitive adhesive tape
2 pressure-sensitive adhesive layer
2a Surface of pressure-sensitive adhesive layer 2
3 Substrate for pressure-sensitive adhesive tape or sheet (substrate)
4 Releasable liner
4a Perforation in releasable liner
5 Raised spot of fibers
6 Releasable substrate
7 Release face
8 Hole
8a Periphery of hole 8
9 Swollen hill
10 thickened wall
11 Releasable substrate of plastic
12 Release face
13 Perforation
13a Periphery of perforation 13
14 Molten ring
15 Pressure-sensitive adhesive tape or sheet
15a Pressure-sensitive adhesive layer
15a1 Surface of pressure-sensitive adhesive layer 15a
15b Substrate for pressure-sensitive adhesive tape or sheet
16 Holes-having releasable substrate
16a Perforations of perforated releasable substrate
16a1 Periphery of perforation 16a
16b Swollen hill
16c Thickened wall
17 Raised spots of fibers
18 Roll of pressure-sensitive adhesive tape
19 Perforated releasable liner
19a Perforation
20 Double-sided pressure-sensitive adhesive sheet
20a Releasable liner
20b Pressure-sensitive adhesive layer
20c Substrate
20d Pressure-sensitive adhesive layer having raised spots of fibers in its surface
20e Perforated releasable liner
20f Perforation of releasable liner 20e
20g Raised spots of fibers in the surface of the pressure-sensitive adhesive layer 20d
21 Perforated releasable liner
21a Perforation
21b Molten ring
22 Double-sided pressure-sensitive adhesive sheet
22a Releasable liner
22b Pressure-sensitive adhesive layer
22c Substrate
22d Pressure-sensitive adhesive layer having raised spots of fibers in its surface
22e Perforated releasable liner
22f Perforation of releasable liner 22e
22g Raised spots of fibers in the surface of the pressure-sensitive adhesive layer 22d
22h Molten ring around the perforation 22f

DETAILED DESCRIPTION OF THE INVENTION (Projected Spots of Fibers)

In the pressure-sensitive adhesive tape or sheet of the invention, projected spots of fibers are partly formed in the surface of the pressure-sensitive adhesive layer formed on at least one surface of the support thereof. It is important that the projected spots of fibers are so designed that the pressure-sensitive adhesive tape or sheet having them can be temporarily adhered to an adherend via them and that it can be firmly adhered to the adherend after subsequent pressure application thereto. The projected spots of fibers are not specifically defined provided that they are spotwise projected and are formed of fibers. For example, they include raised spots of fibers that are raised from the surface of the pressure-sensitive adhesive layer, and projected spots of fibers where fiber masses are spotwise provided on the surface of the pressure-sensitive adhesive layer. The projected spots of fibers may all have one and the same structure, or may have different structures as combined.

One projected spot of fibers is generally composed of multiple fibers. The number and the density of the fibers that constitute one projected spot are not specifically defined, and may be suitably determined depending on the intended reworkability and the repositionability of the pressure-sensitive adhesive tape or sheet of the invention and on the type of the adherend to which the pressure-sensitive adhesive tape or sheet is to be adhered.

Preferably, the projected spots of fibers are raised spots of fibers that are raised from the surface of the pressure-sensitive adhesive layer.

Figure 1B:
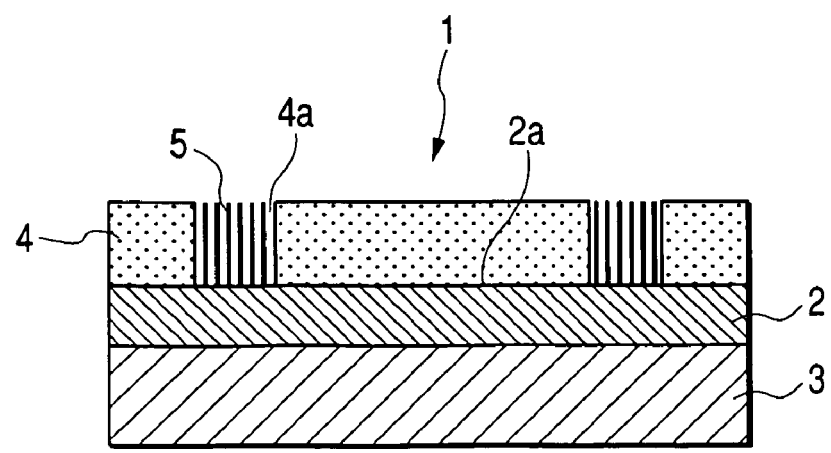

FIGS. 1A and 1B are schematic views partly showing one example of the pressure-sensitive adhesive tape or sheet of the invention. FIG. 1A is a schematic plan view of the pressure-sensitive adhesive tape or sheet seen on its top; and FIG. 1B is a schematic cross-sectional view of FIG. 1A cut along the X-Y line. In FIGS. 1A and 1B, 1 is a pressure-sensitive adhesive tape or sheet; 2 is a pressure-sensitive adhesive layer; 2a is a surface of the pressure-sensitive adhesive layer 2; 3 is a substrate for pressure-sensitive adhesive tape or sheet (this may be hereinafter simply referred to as "substrate"); 4 is a releasable liner; 4a is a perforation of the releasable liner 4; 5 is a raised spot of fibers. The pressure-sensitive adhesive tape or sheet 1 is so constituted that the pressure-sensitive adhesive layer 2 is formed on one surface of the substrate 3 serving as a support, and the pressure-sensitive adhesive layer 2 is protected with the releasable liner 4. In the surface 2a of the pressure-sensitive adhesive layer 2, raised spots 5 of fibers are provided as the projected spots of fibers in the sites corresponding to the perforations 4a of the releasable liner 4. In FIGS. 1A and 1B, the raised spots 5 of fibers are so positioned that they form multiple lines as a whole. The distance between the adjacent lines (the distance between the center parts of the adjacent lines) is 10 mm, and the distance between the raised spots of fibers that are in one line (the distance between the center parts of the adjacent raised spots of fibers) is 10 mm. Regarding the profile of one raised spot of fibers in the surface of the pressure-sensitive adhesive layer, the part is almost circular, having a radius of about 0.5 mm (and having an area of about 0.8 mm$^2$) The adjacent lines of the raised spots of fibers are so designed that the raised spots of fibers in one line are formed at the sites each corresponding to the center part of the adjacent raised spots of fibers in the other line.

Figure 2:
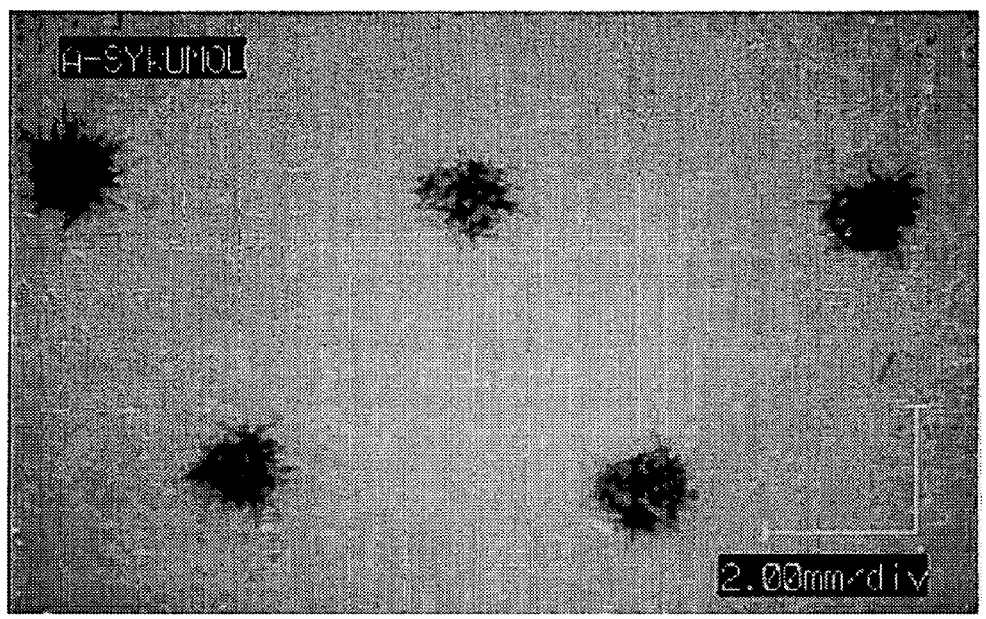
FIG. 2 is a diagram based on a photograph showing the profile of raised spots of fibers formed on the surface of a pressure-sensitive adhesive layer, and this is seen on the top of the pressure-sensitive adhesive layer.
Figure 3:
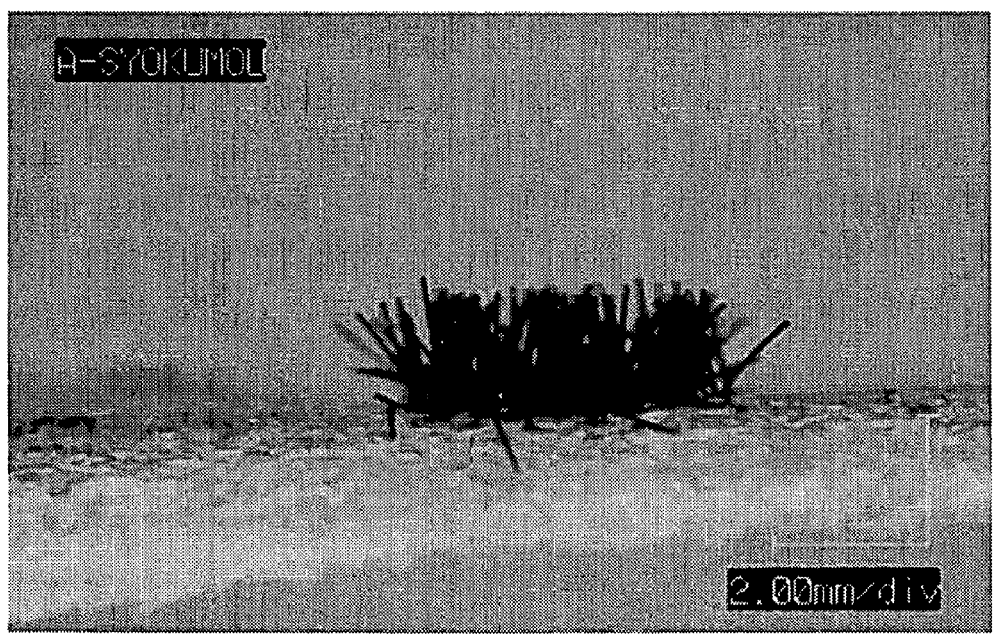
FIG. 3 is a diagram based on a photograph showing the profile of one raised spot of fibers formed on the surface of a pressure-sensitive adhesive layer, and this is an enlarged view of the essential part of the raised spots of fibers of FIG. 2.
Figure 4:
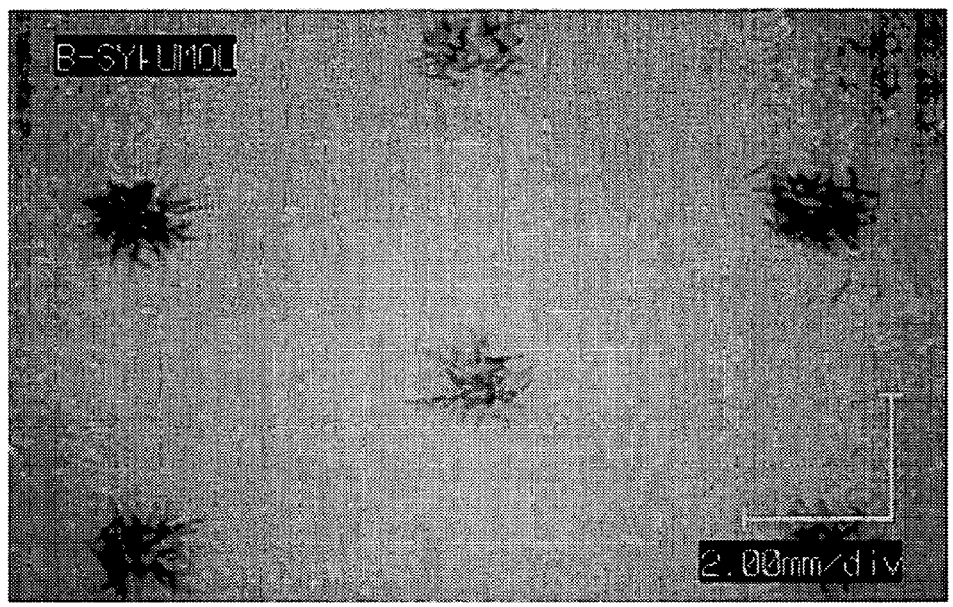
FIG. 4 is a diagram based on a photograph showing the profile of raised spots of fibers formed on the surface of a pressure-sensitive adhesive layer, and this is seen on the top of the pressure-sensitive adhesive layer.
Figure 5:
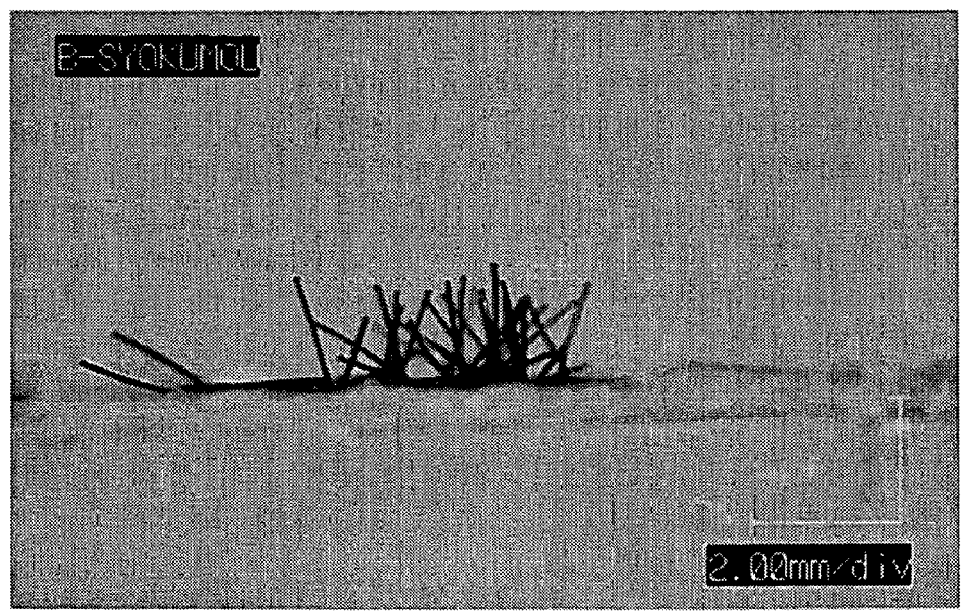
FIG. 5 is a diagram based on a photograph showing the profile of one raised spot of fibers formed on the surface of a pressure-sensitive adhesive layer, and this is an enlarged view of the essential part of the raised spots of fibers of FIG. 4.
Figure 6:
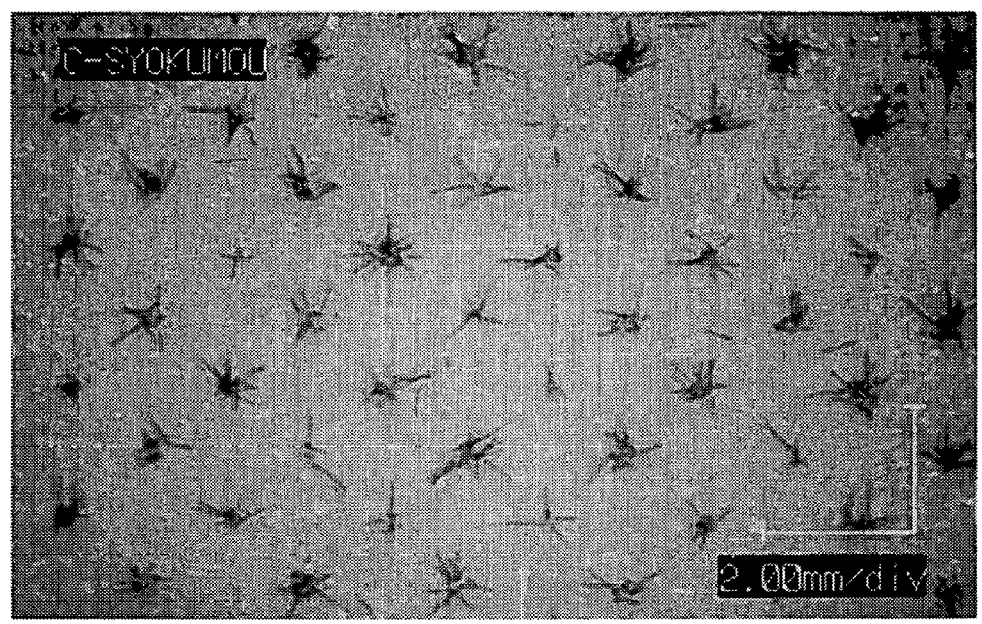
FIG. 6 is a diagram based on a photograph showing the profile of raised spots of fibers formed on the surface of a pressure-sensitive adhesive layer, and this is seen on the top of the pressure-sensitive adhesive layer.
Figure 7:
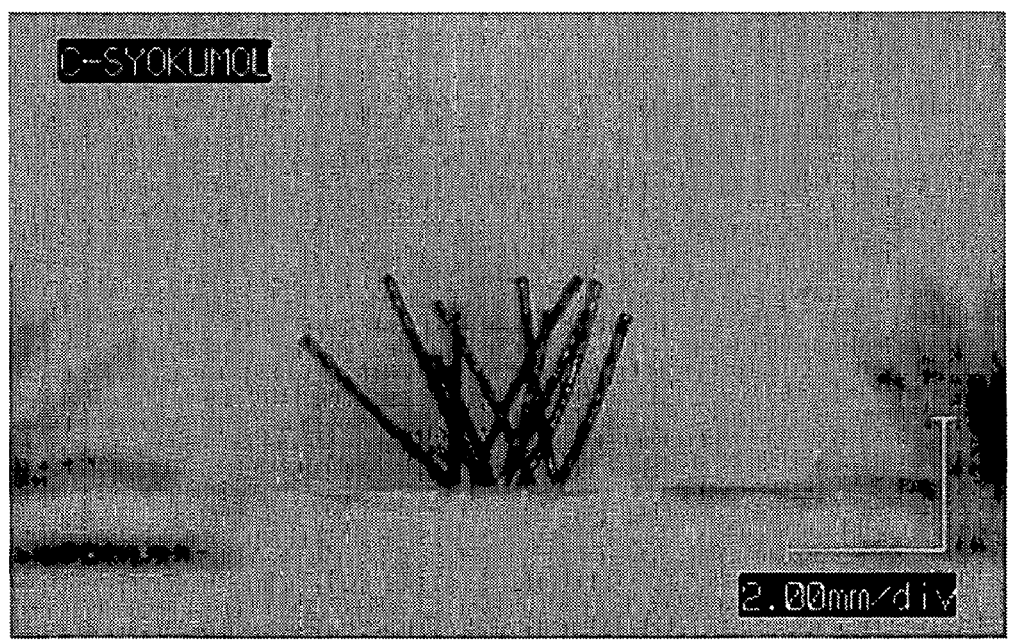
FIG. 7 is a diagram based on a photograph showing the profile of one raised spot of fibers formed on the surface of a pressure-sensitive adhesive layer, and this is an enlarged view of the essential part of the raised spots of fibers of FIG. 6.

FIGS. 2 to 7 are diagrams based on photographs showing the profile of raised spots of fibers formed in the surface of a pressure-sensitive adhesive layer. FIG. 2 is a diagram based on a photograph showing the profile of raised spots of fibers formed on the surface of a pressure-sensitive adhesive layer, and it is seen on the top of the pressure-sensitive adhesive layer. FIG. 3 is a diagram based on a photograph showing the profile of one raised spot of fibers formed on the surface of a pressure-sensitive adhesive layer, and it is an enlarged view of the essential part of the raised spots of fibers of FIG. 2. FIG. 4 is a diagram based on a photograph showing the profile of raised spots of fibers formed on the surface of a pressure-sensitive adhesive layer, and it is seen on the top of the pressure-sensitive adhesive layer. FIG. 5 is a diagram based on a photograph showing the profile of one raised spot of fibers formed on the surface of a pressure-sensitive adhesive layer, and it is an enlarged view of the essential part of the raised spots of fibers of FIG. 4. FIG. 6 is a diagram based on a photograph showing the profile of raised spots of fibers formed on the surface of a pressure-sensitive adhesive layer, and it is seen on the top of the pressure-sensitive adhesive layer. FIG. 7 is a diagram based on a photograph showing the profile of one raised spot of fibers formed on the surface of a pressure-sensitive adhesive layer, and it is an enlarged view of the essential part of the raised spots of fibers of FIG. 6.

The diagrams of FIGS. 2 to 7 are based on photographs which were taken at a magnification power of from 50 to 175 times, by the use of a digital microscope, VH-6200 (trade name by Keyence).

Figure 14A:
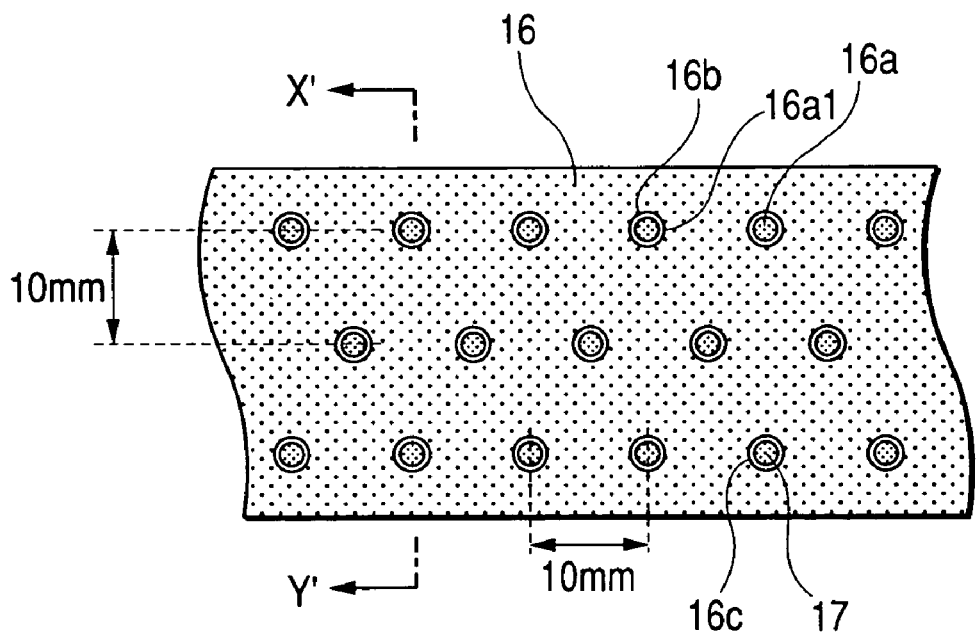
FIGS. 14A and 14B are schematic views partly showing one example of the pressure-sensitive adhesive tape or sheet of the invention.
Figure 14B:
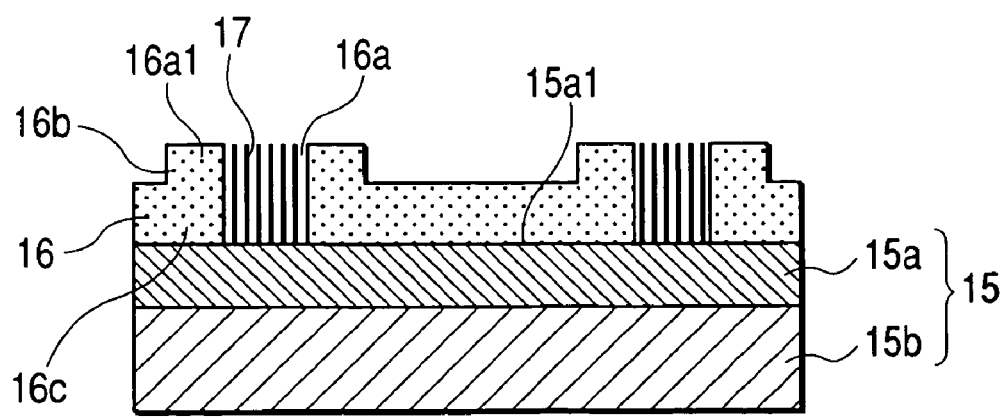

Regarding the structure of the raised spots of fibers, for example, there are mentioned (1) a structure in which one end of each one fiber is adhered and fixed to the surface of a pressure-sensitive adhesive layer while the other end thereof is not fixed (but kept free), and the fibers are raised from the surface of the pressure-sensitive adhesive layer almost in I-shape (as in FIG. 1B and FIG. 14B); (2) the center part of each one fiber is adhered and fixed to the surface of a pressure-sensitive adhesive layer while both ends thereof are not fixed (but kept free), and the fibers are raised from the surface of the pressure-sensitive adhesive layer almost in V-shape; (3) both ends of each one fiber are adhered and fixed to the surface of a pressure-sensitive adhesive layer, while the center part thereof is not fixed (but kept free), and the fibers are raised from the surface of the pressure-sensitive adhesive layer almost in reversed U-shape; as well as other structures in which fibers are raised from the surface of a pressure-sensitive adhesive layer almost in any of W-shape, M-shape, N-shape or O-shape; and their combinations. For the structure of the raised spots of fibers, preferred is the above-mentioned structure (1) in which fibers are raised from the surface of a pressure-sensitive adhesive layer almost in I-shape. Needless-to-say, in the raised spots of fibers, fibers may be raised linearly in I-shape from the surface of the pressure-sensitive adhesive layer for pressure-sensitive adhesive tape or sheet, or may be in any other form of notches, waves or loops to rise as a whole from the surface.

The projected spots of fibers are partly formed in the surface of a pressure-sensitive adhesive layer. In that manner, the projected spots of fibers that are partly formed in the surface of a pressure-sensitive adhesive layer are not specifically defined in point of their overall profile. The overall profile of the projected spots of fibers may be suitably determined, depending on the intended reworkability and the repositionability of the pressure-sensitive adhesive tape or sheet of the invention and on the type of the adherend to which the pressure-sensitive adhesive tape or sheet is to be adhered, and may be designed, for example, to have a predetermined pattern.

For example, when the projected spots of fibers are formed to have a pattern profile as in FIG. 1A or FIG. 14A as a whole, or that is, when they are so designed as to form multiple lines as a whole, then the distance between the adjacent lines may be, for example, from 1 to 100 mm (preferably from 3 to 50 mm, more preferably from 5 to 40 mm) or so. The distance between the adjacent projected spots of fibers in one line may be, for example, from 1 to 100 mm (preferably from 3 to 50 mm, more preferably from 5 to 40 mm) or so. The positional relationship of the projected spots of fibers in the adjacent lines is not also specifically defined, and the projected spots may be so positioned that they form a lattice-like pattern as a whole or may be positioned at random as a whole.

The profile of one projected spot of fibers on the surface of a pressure-sensitive adhesive layer is not also specifically defined. For example, it may be almost circular or almost polygonal, or may have irregular forms. The number of the projected spots of fibers formed in the surface of a pressure-sensitive adhesive layer is not also specifically defined.

The overall area of the sites at which the projected spots of fibers are provided in the surface of a pressure-sensitive adhesive layer (this corresponds to an area of all the projected spots of fibers) is not also specifically defined. For example, it may be from 0.001 to 20% (preferably from 0.005 to 15%, more preferably from 0.01 to 10%) of the entire surface of the pressure-sensitive adhesive layer. If the area of all the projected spots of fibers in the surface of a pressure-sensitive adhesive layer is smaller than 0.001% of the overall area of the layer, then the initial adhesive force of the pressure-sensitive adhesive layer could not be well reduced and therefore the reworkability and the repositionability of the pressure-sensitive adhesive tape or sheet having the layer will be therefore poor. On the other hand, if the area of all the projected spots of fibers in the surface of a pressure-sensitive adhesive layer is larger than 20% of the overall area of the pressure-sensitive adhesive layer, then the reworkability and the repositionability of the pressure-sensitive adhesive tape or sheet will be good but the adhesive force of the tape or sheet to adherends will lower.

The area of each projected spot of fibers is not specifically defined. For example, it may be from 0.1 to 10 mm$^2$ (preferably from 0.3 to 5 mm$^2$, more preferably from 0.5 to 3 mm$^2$) or so. Not limited to the range, however, the area may be smaller than 0.1 mm$^2$ or may be larger than 10 mm$^2$.

For example, when multiple projected spots of fibers are provided in such a manner that the area of each projected spot is from 0.1 to 10 mm$^2$, then the shortest distance between the adjacent projected spots of fibers may be, for example, from 1 to 100 mm (preferably from 3 to 50 mm, more preferably from 5 to 40 mm) or so.

The fibers to constitute the projected spots are not specifically defined, and may be any of natural fibers, semi-synthetic fibers, or synthetic fibers. More concretely, the fibers include, for example, cotton fibers, rayon fibers, polyamide fibers [e.g., aliphatic polyamide fibers, aromatic polyamide fibers (aramid fibers)], polyester fibers (e.g., trade name, Tetron), polyacrylonitrile fibers, carbon fibers (carbon-based fibers), acrylic fibers, polyvinyl alcohol fibers (vinylon fibers), polyethylene fibers, polyimide fibers, polyolefin fibers, silicone fibers, fluorine-containing fibers (fluororesin fibers). For the fibers for use herein, preferred are cotton fibers, rayon fibers, polyamide fibers, polyester fibers.

One or more different types of fibers may be used herein either singly or as combined.

Short fibers are preferred for use herein. Long fibers are unfavorable since they lower the adhesive force of the pressure-sensitive adhesive tape or sheet of the invention to adherends. Concretely, it is desirable that the length of the fibers falls between 0.1 and 5 mm (more preferably between 0.3 and 5 mm, even more preferably between 0.3 and 2 mm) or so. If the fibers are too short, then the pressure to be applied to the pressure-sensitive adhesive tape or sheet for fixing the pressure-sensitive adhesive layer thereof to adherends may be low. However, this is unfavorable since the reworkability and the repositionability of the pressure-sensitive adhesive tape or sheet will be not good in that condition. In addition, too short fibers are difficult to produce and are therefore expensive. Therefore, using too short fibers is unfavorable from the point of economical view.

The thickness of the fibers is not specifically defined. For example, it may be from 0.1 to 20 deniers (preferably from 0.5 to 15 deniers, more preferably from 1 to 6 deniers). If too thick, the fibers are unfavorable since they are not flexible and therefore require high pressure for adhering the pressure-sensitive adhesive layer with them to adherends. On the other hand, too thin fibers are also unfavorable since they are ineffective for reducing the initial adhesive force of the pressure-sensitive adhesive layer with them to adherends, and the reworkability and the repositionability of the pressure-sensitive adhesive tape or sheet with them will be therefore poor.

The method for forming the projected spots of fibers (especially the raised spots of fibers) is not specifically defined. For it, for example, a flocking technique (especially electrostatic flocking technique) is preferably employed. According to the electrostatic flocking method, the surface of the pressure-sensitive adhesive layer may be flocked in any of upward, downward or sideward direction. When the surface of the pressure-sensitive adhesive layer is flocked to form the projected spots of fibers in predetermined sites thereof according to the flocking method, it is desirable to use a releasable substrate (especially releasable film) that has holes in the sites corresponding to the predetermined sites where the projected spots of fibers are to be formed in the surface of the pressure-sensitive adhesive layer. (Pressure-sensitive adhesive layer)

The pressure-sensitive adhesive to form the pressure-sensitive adhesive layer is not specifically defined, and may be any known one. For example, it includes rubber pressure-sensitive adhesives, acrylic pressure-sensitive adhesives, polyester pressure-sensitive adhesives, urethane pressure-sensitive adhesives, polyamide pressure-sensitive adhesives, epoxy pressure-sensitive adhesives, vinyl alkyl ether pressure-sensitive adhesives, silicone pressure-sensitive adhesives, fluorine-containing pressure-sensitive adhesives. The pressure-sensitive adhesives may be hot-melt pressure-sensitive adhesives. One or more such pressure-sensitive adhesives may be used herein either singly or as combined. The pressure-sensitive adhesives may be in any form of emulsion pressure-sensitive adhesives, solution pressure-sensitive adhesives, oligomer pressure-sensitive adhesives or solid pressure-sensitive adhesives.

The pressure-sensitive adhesives may contain, in addition to the polymer component that serves as the pressure-sensitive adhesive component (base polymer) thereof, any additives such as crosslinking agent (e.g., polyisocyanate-based crosslinking agent, alkyletherified melamine compound-based crosslinking agent), tackifier (e.g., rosin derivative resin, polyterpene resin, petroleum resin, phenolic resin), plasticizer, filler, anti-aging agent and the like, depending on the type of the pressure-sensitive adhesives. When the pressure-sensitive adhesive is crosslinked in forming the pressure-sensitive adhesive layer, any method is employable, including, for example, thermal crosslinking to be effected under heat, ultraviolet crosslinking to be effected through exposure to UV rays (UV crosslinking), electron beam crosslinking to be effected through exposure to electron beams (EB crosslinking), or natural curing to be effected at room temperature for spontaneously curing the pressure-sensitive adhesive.

For the pressure-sensitive adhesive, preferred are rubber pressure-sensitive adhesives that comprise, as the base polymer thereof, any of natural rubbers or various synthetic rubbers (e.g., polyisoprene rubber, styrene-butadiene rubber, styrene-isoprene-styrene block copolymer rubber, styrene-butadiene-styrene block copolymer rubber, regenerated rubber, butyl rubber, polyisobutylene); and acrylic pressure-sensitive adhesives that comprise, as the base polymer thereof, any of acrylic polymers (homopolymers or copolymers) from one or more monomers of alkyl (meth)acrylates.

The alkyl (meth)acrylates for the acrylic pressure-sensitive adhesives are, for example, $C_{1-20}$ alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth) acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate [preferably $C_{4-18}$ (linear or branched) alkyl (meth)acrylates]. These alkyl (meth) acrylates may be suitably selected depending on the intended adhesiveness of the pressure-sensitive adhesives to be prepared. One or more such alkyl (meth)acrylate may be used herein either singly or as combined.

In the acrylic pressure-sensitive adhesives, the alkyl (meth)acrylate may be optionally copolymerized with any other monomer copolymerizable with the alkyl (meth)acrylate (comonomer). The comonomer includes, for example, carboxyl group-containing monomers and their anhydrides, such as (meth)acrylic acid, itaconic acid, maleic acid, fumaric acid, crotonic acid, isocrotonic acid; sulfonic acid group-containing monomers such as sodium vinylsulfonate; aromatic vinyl compounds such as styrene, substituted styrene; cyano group-containing monomers such as acrylonitrile; olefins such as ethylene, propylene, butadiene; vinyl esters such as vinyl acetate; vinyl chloride; amido group-containing monomers such as acrylamide, methacrylamide, N-vinylpyrrolidone, N,N-dimethyl(meth)acrylamide; hydroxyl group-containing monomers such as hydroxyalkyl (meth)acrylate, glycerin dimethacrylate; amino group-containing monomers such as aminoethyl (meth)acrylate, (meth)acryloylmorpholine; imido group-containing monomers such as cyclohexylmaleimide, isopropylmaleimide; epoxy group-containing monomers such as glycidyl (meth) acrylate, methylglycidyl (meth)acrylate; isocyanato group-containing monomers such as 2-methacryloyloxyethyl isocyanate. The comonomer further includes polyfunctional comonomers (polyfunctional monomers), such as triethylene glycol di(meth)acrylate, diethylene glycol di(meth)acrylate, ethylene glycol di(meth)acrylate, tetraethylene glycol di(meth)acrylate, neopentyl glycol di(meth)acrylate, 1,6-hexanediol di(meth)acrylate, trimethylolpropane tri(meth) acrylate, pentaerythritol tri(meth)acrylate, dipentaerythritol hexa(meth)acrylate, divinylbenzene. One or more of these comonomers may be used herein either singly or as combined.

For forming the pressure-sensitive adhesive layer, any known or conventional method may be employed. For example, when a substrate-supported pressure-sensitive adhesive tape or sheet that has a substrate for it is produced, a pressure-sensitive adhesive may be applied onto the substrate that serves as a support (substrate for pressure-sensitive adhesive tape or sheet) (coating method); or a pressure-sensitive adhesive is first applied onto a releasable film such as a releasable liner to form a pressure-sensitive adhesive layer thereon, and then the pressure-sensitive adhesive layer is transferred onto a substrate (transfer method). On the other hand, when a substrateless pressure-sensitive adhesive tape or sheet that does not have a substrate for it is produced, a pressure-sensitive adhesive may be applied onto the release face of a releasable liner that serves as a support for the tape or sheet (coating method).

The thickness of the pressure-sensitive adhesive layer is not specifically defined. It may fall, for example, between 1 and 1000 μm (preferably between 10 and 500 μm) or so.

(Support)

The support for the pressure-sensitive adhesive layer is described. When the pressure-sensitive adhesive tape or sheet is a substrate-supported one that has a pressure-sensitive adhesive layer on one or both surfaces thereof, it may have a substrate (for pressure-sensitive adhesive tape or sheet). On the other hand, when the pressure-sensitive adhesive tape or sheet is a substrateless double-sided pressure-sensitive adhesive tape or sheet, a releasable liner (separator) may be employed. In the substrate-supported, single-sided pressure-sensitive adhesive or double-sided pressure-sensitive adhesive tape or sheet, the substrate that serves as a support is coated with a pressure-sensitive adhesive layer on one or both surfaces thereof, and projected spots of fibers are partly formed in the surface of the pressure-sensitive adhesive layer formed on one or both surfaces of the substrate, and the surface of the pressure-sensitive adhesive layer may be protected with the release face on the back of the substrate and with a releasable liner provided on it. On the other hand, in the substrateless double-sided pressure-sensitive adhesive tape or sheet, the releasable liner serves as a support for the pressure-sensitive adhesive layer, and projected spots of fibers are partly formed in one or both surfaces of the pressure-sensitive adhesive layer. The releasable liner that serves as a support acts to support the pressure-sensitive adhesive layer and to protect the surface of the pressure-sensitive adhesive layer until the pressure-sensitive adhesive tape or sheet is used.

(Substrate)

For the substrate (for pressure-sensitive adhesive tape or sheet), usable are any suitable thin leafy bodies, for example, plastic substrates such as plastic films or sheets; metal substrates such as metal foilsi metal plates; paper substrates of paper (e.g., woodfree paper, Japanese paper, kraft paper, glassine paper, synthetic paper, top-coated paper); fibrous substrates such as fabrics, nonwoven fabrics, nets; rubber substrates such as rubber sheets; foams such as foamed sheets. The substrate may be single-layered or multi-layered. For example, the substrate may have a multi-layered (two or three-layered) structure of a plastic substrate with any other substrate (e.g., paper substrate) fabricated in a mode of lamination or co-extrusion.

For the substrate, plastic films and sheets are preferred. The material for the plastic films and sheets (plastic material) includes, for example, olefin resins from a-olefin monomer such as polyethylene (PE), polypropylene (PP), ethylene-propylene copolymer, ethylene-vinyl acetate copolymer (EVA); polyester resins such as polyethylene terephthalate (PET), polyethylene naphthalate (PEN), polybutylene terephthalate (PBT); polyvinyl chloride (PVC); vinyl acetate resins; polyphenylene sulfide (PPS); amide resins such as polyamide (nylon), whole aromatic polyamide (aramid); polyimide resins; polyether-ether ketone (PEEK). Two or more such plastic materials may be used herein either singly or as combined. The plastic films or sheets may be non-oriented ones, or may be mono- or bi-oriented ones.

If desired, the substrate may contain various additives such as inorganic filler (e.g., titanium oxide, zinc oxide), anti-aging agent (e.g., amine-type anti-aging agent, quinoline-type anti-aging agent, hydroquinone-type anti-aging agent, phenolic-type anti-aging agent, phosphorus-containing anti-aging agent, phosphite-type anti-aging agent), anti-oxidant, UV absorbent (e.g., salicylic acid derivative, benzophenone-type UV absorbent, benzotriazole-type UV absorbent, hindered amine-type UV absorbent), lubricant, plasticizer, colorant (e.g., pigment, dye).

One or both surfaces of the substrate may be suitably processed through physical treatment such as corona treatment or plasma treatment, or chemical treatment such as undercoating, for the purpose of increasing the adhesive force thereof to the pressure-sensitive adhesive layer to be formed on the substrate.

The thickness of the substrate may fall, for example, between 10 and 300 µm, preferably between 30 and 200 µm or so.

(Releasable Liner)

For the releasable liner, for example, usable are substrates coated with a release agent to form a release agent layer on at least one surface thereof, as well as low-adhesive substrates formed of fluorine-containing polymer (e.g., polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer), and low-adhesive substrates formed of non-polar polymer (e.g., olefin resin such as polyethylene, polypropylene).

For the releasable liner, for example, preferred are those formed by coating at least one surface of a releasable liner substrate with a release agent layer. The releasable liner substrate includes, for example, plastic substrate films (synthetic resin films) such as polyester films (e.g., polyethylene terephthalate films), olefin resin films (e.g., polyethylene films, polypropylene films), polyvinyl chloride films, polyimide films, polyamide films (e.g., nylon films); paper (e.g., woodfree paper, Japanese paper, kraft paper, glassine paper, synthetic paper, top-coated paper); as well as their multi-layered composites (two- or three-layered composites) fabricated through lamination or co-extrusion.

The release agent to form the release agent layer is not specifically defined. For example, it includes silicone-type release agent, fluorine-containing release agent, long-chain alkyl-type release agent. One or more such release agents may be used herein either singly or as combined.

For the release agent, preferred are silicone-type release agents in view of their releasability and cost. It may be selected from known polysiloxane-type release agents (silicone-type release agents) that comprise a polysiloxane polymer as the essential component thereof. Of such silicone-type release agents, more preferred are polysiloxane-type release agents that undergo addition reaction. The addition-reactive polysiloxane-type release agents may cure through addition-reaction crosslinking (curing reaction) to form a releasable film, and the film exhibits good releasability.

The addition-reactive polysiloxane-type release agent that is employable herein may be a polysiloxane-type release agent composition that contains a polysiloxane polymer having, in the molecule, at least two groups reactive with an Si—H bond-containing group (concretely, the reactive group includes an alkenyl group such as vinyl group or hexenyl group; the "group reactive with an Si—H bond-containing group" may be hereinunder simply referred to as "alkenyl group"), and a polysiloxane polymer having, in the molecule, at least two hydrogen atoms bonding to a silicon atom (in particular, polysiloxane polymer having, in the molecule, at least two silicon atoms having an Si—H bond). The "Si—H bond" means "a bond between a silicon atom (Si) and a hydrogen atom (H)".

In the polysiloxane polymer having at least two alkenyl groups, the polysiloxane polymer structure to form the main chain or the backbone skeleton includes, for example, polyalkylalkylsiloxane polymers such as polydimethylsiloxane polymer, polydiethylsiloxane polymer, polymethylethylsiloxane polymer; polyalkylarylsiloxane polymers; as well as copolymers of multiple silicon-containing monomers [e.g., poly(dimethylsiloxane-dimethylsiloxane)]. Of those, polydimethylsiloxane polymer is preferred.

On the other hand, in the polysiloxane polymer having at least two silicon atoms having an Si—H bond in the molecule, the silicon atom having an Si—H bond may be in any of the main chain or the side branches of the polymer, or that is, it may be in the constitutive units of the main chain or in the constitutive units of the side branches. The number of the silicon atoms to form Si—H bond (the silicon atoms bonded with hydrogen atom) is not specifically defined, provided that it is at least 2.

For the polysiloxane polymer having at least two silicon atoms having an Si—H bond in the molecule, preferred are those having at least two monomer units of —Si (R) (H)O— (where R indicates a hydrocarbon group) in the molecule, and more preferred are polydimethylhydrogensiloxane polymers [e.g., poly(dimethylsiloxane-methylsiloxane)].

In the polysiloxane release agent, the polysiloxane polymer having at least two silicon atoms having an Si—H bond in the molecule functions as a crosslinking agent.

The amount of the polysiloxane polymer having at least two silicon atoms having an Si—H bond in the molecule is not specifically defined. For example, it is preferably so controlled that the number of mols of the silicon atom of the Si—H bond in the polysiloxane polymer having at least two silicon atoms having an Si—H bond in the molecule (this may be hereinafter referred to as "molar number (X)") and the number of mols of the alkenyl group in the polysiloxane polymer having at least two alkenyl groups (this may be hereinafter referred to as "molar number (Y)") may be in a ratio of molar number (X)>molar number (Y). However, the ratio of molar number (X)/molar number (Y) may fall between 0.8 and 3.0 (preferably between 1.1 and 1.8) or so.

When the polysiloxane polymer having at least two alkenyl groups in the molecule is cured by the action thereon of the polysiloxane polymer having at least two silicon atoms having an Si—H bond in the molecule (crosslinking agent), a catalyst may be used. For the catalyst, for example, preferred is a platinum catalyst (e.g., platinum particles, platinum compounds such as chloroplatinic acid or its derivatives). The amount of the catalyst to be used is not specifically defined. For example, it may be from 0.1 to 1000 ppm (preferably from 1 to 100 ppm) relative to the polysiloxane polymer having at least two alkenyl groups in the molecule.

For the polysiloxane-type release agent for use in the invention, preferred is a polydimethylsiloxane release agent that comprises a polydimethylsiloxane polymer having at least two vinyl groups, as alkenyl groups, in the molecule, and a polydimethylhydrogensiloxane polymer having at lest two monomer units of —Si(R)(H)O— (wherein R indicates a hydrocarbon group) in the molecule.

The polysiloxane release agent may be prepared by mixing the above-mentioned constitutive components (e.g., the polydimethylsiloxane polymer having at least two alkenyl groups in the molecule, the polysiloxane polymer having at least two silicon atoms having an Si—H bond in the molecule, and optionally catalyst and various additives) optionally in an organic solvent. In the polysiloxane release agent, the polymer component such as the polysiloxane polymer may be dissolved in an organic solvent. If desired, the polysiloxane release agent may contain known or conventional additives (e.g., filler, antistatic agent, antioxidant, Uv absorbent, plasticizer, colorant (e.g., dye, pigment)).

Some polysiloxane release agents of the type are available on the market, for example, as TPR6600 (trade name by GE Toshiba Silicone), KS-778 (trade name by Shin-etsu Chemical), and KS-837 (trade name by Shin-etsu Chemical).

The release layer may be formed by applying the release agent onto a predetermined face (at least one surface) of a releasable liner substrate followed by heating it for drying and curing. In the heating step for drying and curing, any known or conventional heating method (for example, with a hot-air drier) may be employed. When the addition-reactive polysiloxane release agent is used, it may be applied onto a predetermined face of a releasable liner substrate and then dried or cured for addition reaction to give a releasable film, and the film thus formed exhibits good releasability.

It is important that the amount of the release agent is suitably controlled. If the amount of the release agent used is too small, then the releasing force (force necessary for release) will increase and it is problematic in practical use; but on the other hand, if the amount is too large, it is expensive and is therefore uneconomical. The suitable amount of the release agent (as a solid content thereof) may be determined depending on the type of the release agent used, and is, for example, from 0.01 to 5 $g/m^2$ (preferably from 0.05 to 3 $g/m^2$, more preferably from 0.2 to 1 $g/m^2$) or so.

The thickness of the releasable liner, the thickness of the releasable liner substrate and the thickness of the release layer are not specifically defined, and may be suitably determined depending on the profile and the pattern of the projected spots of fibers to be formed on the pressure-sensitive adhesive layer of the pressure-sensitive adhesive tape or sheet of the invention.

In particular, when the releasable liner is used for protecting the surface of the pressure-sensitive adhesive layer that has projected sots of fibers thereon, then it is desirable that the liner has recesses (holes or depressions) in the sites corresponding to the projected spots of fibers formed in the surface of the pressure-sensitive adhesive layer. In particular, the releasable liner as in FIGS. 1A and 1B is preferred, which has holes (especially perforations) in the sites corresponding to the projected spots of fibers formed in the surface of the pressure-sensitive adhesive layer. The releasable liner that has the holes of the type protects the projected spots of fibers so that the fibers do not fall down, and therefore, it is desirable that the thickness of the peripheral region around the holes (especially perforations) of the liner is the same as or larger than the height of the projected sots of fibers.

For forming the recesses (especially holes) in the releasable liner, various methods may be employed. For example, one comprises using a known or conventional recess former [especially, a perforator having a projected structure of various forms and a recessed structure corresponding to the projected structure]; another comprises using heat or light (for forming perforations with thermal head, halogen lamp, xenon lamp, flash lamp, laser or the like); and still another comprises molding with a mold (especially having projected spots). (Pressure-sensitive adhesive tape or sheet)

The pressure-sensitive adhesive tape or sheet includes, for example, (1) a substrate-supported double-sided pressure-sensitive adhesive tape or sheet in which a pressure-sensitive adhesive layer is formed on both surfaces of the substrate thereof serving as a support and projected spots of fibers are partly formed in the surface of the pressure-sensitive adhesive layer on at least one surface of the substrate; (2) a substrate-supported single-sided pressure-sensitive adhesive tape or sheet in which a pressure-sensitive adhesive layer is formed on one surface of the substrate thereof serving as a support and projected spots of fibers are partly formed in the surface of the pressure-sensitive adhesive layer; and (3) a substrateless double-sided pressure-sensitive adhesive tape or sheet in which the pressure-sensitive adhesive layer partly has, in at least one surface thereof, projected spots of fibers and both surfaces of the pressure-sensitive adhesive layer are protected with one or two releasable liners.

The pressure-sensitive adhesive tape or sheet may be a single-sided pressure-sensitive adhesive tape or sheet in which one surface alone is pressure-sensitive adhesive; or may be a double-sided pressure-sensitive adhesive tape or sheet in which both surfaces are pressure-sensitive adhesive. In the double-sided pressure-sensitive adhesive tape or sheet, projected spots of fibers may be formed in one pressure-sensitive adhesive surface or in both pressure-sensitive adhesive surfaces.

Figure 8:
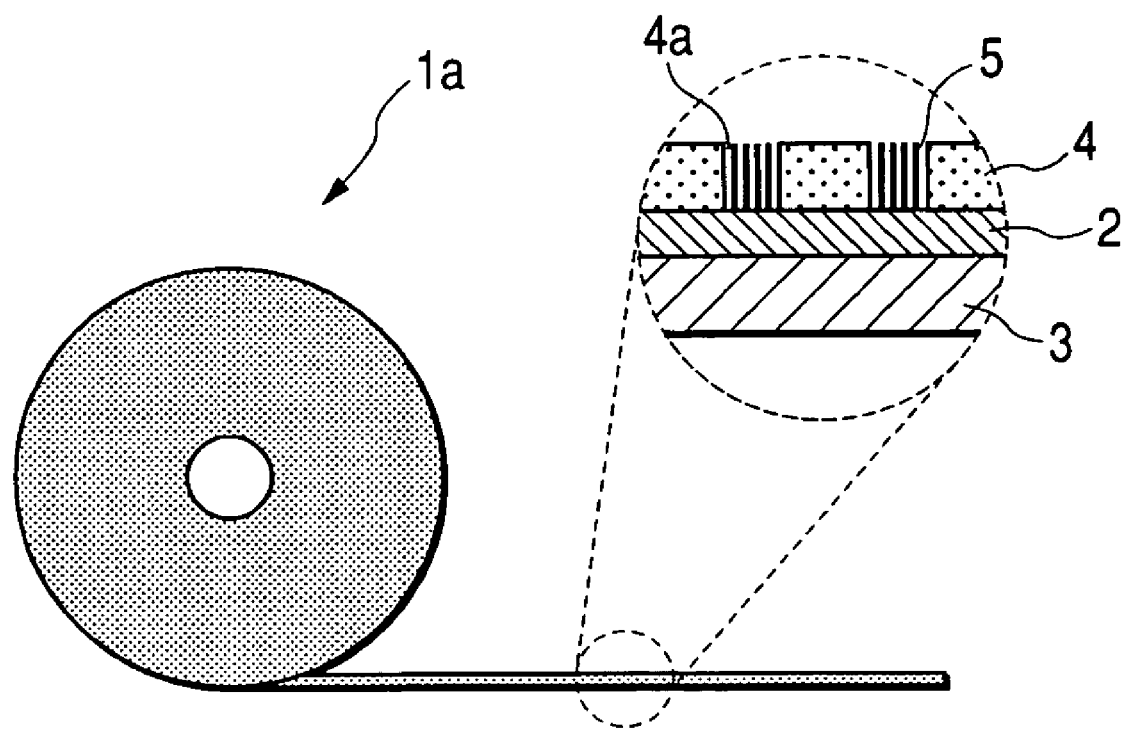
FIG. 8 is a schematic view of a pressure-sensitive adhesive tape (roll) that has raised spots of fibers on one surface of the pressure-sensitive adhesive layer thereof and is wound up into a roll.

The pressure-sensitive adhesive tape or sheet may be wound up into a coil or roll, for example, as in FIG. 8; or the pressure-sensitive adhesive sheet may be in one layer or in multiple layers piled up. FIG. 8 shows a schematic view of a roll of pressure-sensitive adhesive tape. In this, the pressure-sensitive adhesive tape has raised spots of fibers on one surface of the pressure-sensitive adhesive layer, and this is wound up into a roll. In FIG. 8, 1*a* is a roll of pressure-sensitive adhesive tape; and 2, 3, 4, 4*a* and 5 have the same meanings as above. In FIG. 8, the view in the dotted circle is a partly-enlarged cross-sectional view of the pressure-sensitive adhesive tape.

To that effect, the pressure-sensitive adhesive tape or sheet has projected spots of fibers partly in the surface of the pressure-sensitive adhesive layer on at least one surface of the support thereof. Therefore, when this is applied to an adherend in such a manner that the surface of the pressure-sensitive adhesive layer having the projected spots of fibers thereon is in contact with the adherend and a small load is given thereto, then it may be temporarily adhered to the adherend. After this is reworked or repositioned on the adherend, it may be firmly adhered to the adherend when a large load is given thereto. The load for the temporary adhesion is not specifically defined, and may be suitably controlled depending on the height of the projected spots of fibers and on the thickness and the type of the material for the fibers of the projected spots. Specifically, the level of the adhesive force immediately after the temporary adhesion of the pressure-sensitive adhesive tape or sheet to an adherend may be controlled to any desired one, depending on the projected spots of fibers formed in the tape or sheet.

The pressure-sensitive adhesive tape or sheet of the invention may be produced by forming projected spots of fibers in predetermined sites of the surface of the pressure-sensitive adhesive layer on at least one surface of a support. Concretely, the surface of the pressure-sensitive adhesive layer on at least one surface of a support is flocked in predetermined site thereof to thereby form the intended projected spots of fibers partly in the surface of the pressure-sensitive adhesive layer according to a flocking method, and a pressure-sensitive adhesive tape or sheet thus having projected spots of fibers partly in the surface of the pressure-sensitive adhesive layer thereof may be produced. For flocking the pressure-sensitive adhesive layer, especially preferred is a mode of electrostatic flocking.

The electrostatic flocking method is described. For example, an adherend having a pressure-sensitive adhesive layer to be flocked is set as a counter electrode to one electrode, and a high-voltage direct current is applied to these with applying flocks (fibers) between the two electrodes, whereby the flocks are scattered along the line of electric force owing to the coulomb force so as to dash against the surface of the adherend to be flocked (the surface of the pressure-sensitive adhesive layer). In that manner, the surface of the pressure-sensitive adhesive layer may be flocked. The electrostatic flocking method is not specifically defined, and may be any known one. The method may be for flocking adherends in any of upward, downward or sideward direction, for example, as described in "Principle and Practice of Electrostatic Flocking" in Fibers, Vol. 34, No. 6 (1982–6).

For forming projected spots of fibers in predetermined sites of the surface of the pressure-sensitive adhesive layer according to the flocking method (especially, according to the electrostatic flocking method), it is desirable to use a releasable substrate of which at least one surface is a release face and has holes (this may be hereinafter referred to as "holes-having releasable substrate"). When such a holes-having releasable substrate is used, then it is possible to form the intended projected spots of fibers in the sites of the surface of the pressure-sensitive adhesive layer corresponding to the holes of the substrate. Concretely, the surface of the pressure-sensitive adhesive layer is flocked (especially, electrostatically flocked) while it is attached to the release face of the holes-having releasable substrate, whereby the sites of the surface of the pressure-sensitive adhesive layer corresponding to the holes of the holes-having releasable substrate are processed to have the intended projected spots of fibers. Specifically, it is important that the holes-having releasable substrate are to have the holes in the sites corresponding to the predetermined sites of the surface of the pressure-sensitive adhesive layer in which the intended projected spots of fibers are to be formed.

(Releasable Substrate)

The holes-having releasable substrate is not specifically defined provided that at least one surface thereof is a release face relative to the pressure-sensitive adhesive face of a pressure-sensitive adhesive layer and has holes therethrough. Preferably, the substrate is so designed that the peripheral region around the holes is thickened, as swelling toward the side of one face alone. Specifically, the holes-having releasable substrate is preferably so designed that at least one surface thereof is a release face relative to the pressure-sensitive adhesive face of a pressure-sensitive adhesive layer, and the peripheral region around the holes is thickened, as swelling toward the side of one face alone. The substrate of the preferred type may be hereinunder referred to as "periphery-thickened holes-having releasable substrate". When the peripheral region around the holes in the holes-having releasable substrate is thickened in that manner and when the substrate of the type is used, then the intended projected spots of fibers may be readily formed in predetermined sites of the surface of a pressure-sensitive adhesive layer while they are effectively protect with the substrate.

Figure 9A:
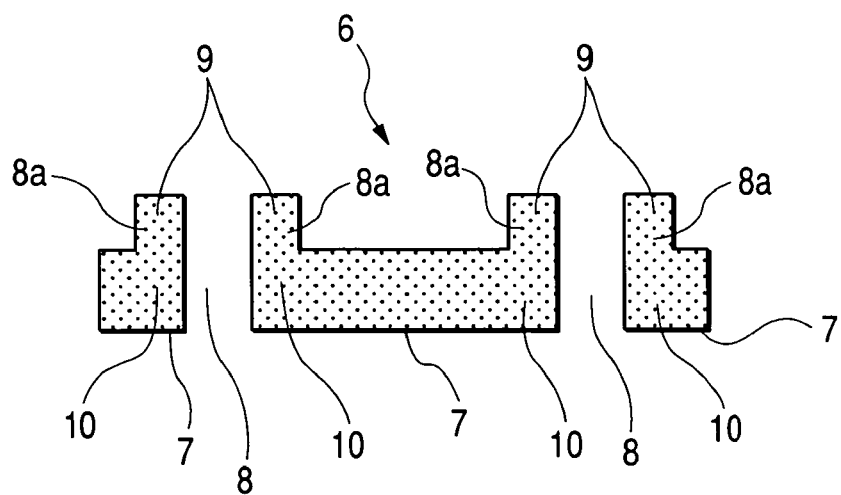
FIGS. 9A and 9B each is a schematic view of one example of the releasable substrate of the invention.
Figure 9B:
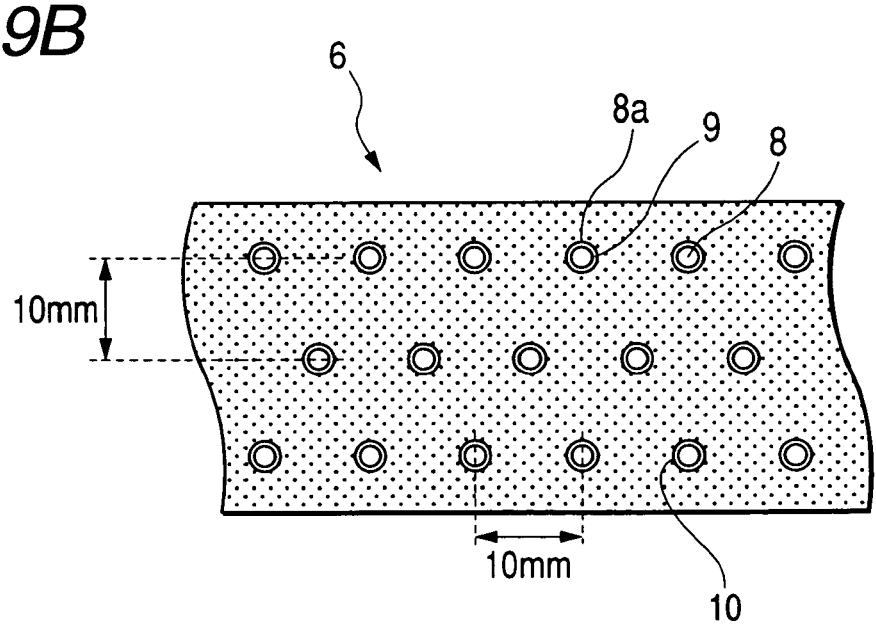

The periphery-thickened holes-having releasable substrate of the invention is so designed that at least one surface thereof is a release face relative to the pressure-sensitive adhesive face of a pressure-sensitive adhesive layer and has holes therethrough, and that the peripheral region around the holes is thickened, as swelling toward the side of one face alone, as so mentioned hereinabove. Concretely, the periphery-thickened holes-having releasable substrate has holes and, in its one face, the peripheral region around the holes swells to form a swollen hill, while the other surface thereof is a release face that does not swell but is flat (flat release face), as in FIGS. 9A and 9B. FIGS. 9A and 9B each is a schematic view showing one example of a releasable substrate of the invention. FIG. 9A is a cross-sectional view of the substrate, and FIG. 9B is a plan view seen on the top face of the substrate where the periphery around the holes swells. In FIGS. 9A and 9B, 6 is a releasable substrate; 7 is a release face; 8 is a hole; 8a is the peripheral region of the hole 8; 9 is a swollen hill; 10 is a thickened wall. Of the releasable substrate 6 in FIGS. 9A and 9B, one surface is a flat release face 7 and has holes 8 therethrough, and the peripheral region 8a around the holes 8 swells toward the back side of the release face 7 to form the swollen hill 9, and, as a result, it forms the thickened wall 10 that swells toward the side of one face alone.

For the holes-having releasable substrate such as the periphery-thickened holes-having releasable substrate mentioned hereinabove, for example, usable are substrates coated with a release agent to form a release agent layer on at least one surface thereof, as well as low-adhesive substrates formed of fluorine-containing polymer (e.g., polytetrafluoroethylene, polychlorotrifluoroethylene, polyvinyl fluoride, polyvinylidene fluoride, tetrafluoroethylene-hexafluoropropylene copolymer, chlorofluoroethylene-vinylidene fluoride copolymer), and low-adhesive substrates formed of non-polar polymer (e.g., olefin resin such as polyethylene, polypropylene).

For the holes-having releasable substrate, for example, preferred are those formed by coating at least one surface of a releasable substrate with a release agent layer. The substrate includes, for example, plastic substrates (synthetic resin substrates) such as polyester films (e.g., polyethylene terephthalate films), olefin resin films (e.g., polyethylene films, polypropylene films), polyvinyl chloride films, polyimide films, polyamide films (e.g., nylon films); paper (e.g., woodfree paper, Japanese paper, kraft paper, glassine paper, synthetic paper, top-coated paper); as well as their multi-layered composites (two- or three-layered composites) fabricated through lamination or co-extrusion.

The release agent to form the release layer is not specifically defined. For example, it includes silicone-type release agent, fluorine-containing release agent, long-chain alkyl-type release agent. One or more such release agents may be used herein either singly or as combined.

For the release agent, preferred are silicone-type release agents in view of their releasability and cost. It may be selected from known polysiloxane-type release agents (silicone-type release agents) that comprise a polysiloxane polymer as the essential component thereof. Of such silicone-type release agents, more preferred are polysiloxane-type release agents that undergo addition reaction. The addition-reactive polysiloxane-type release agents may cure through addition-reaction crosslinking (curing reaction) to form a releasable film, and the film exhibits good releasability. For the addition-reactive polysiloxane-type release agent that is employable herein, referred to are those mentioned hereinabove as the silicone-type releasable agent for the releasable liner. Concretely, its one example is the above-mentioned polysiloxane-type releasable agent composition that comprises a polysiloxane polymer having at least two alkenyl groups (as groups reactive with an Si—H bond-containing group) in the molecule, and a polysiloxane polymer having at least two hydrogen atoms bonding to a silicon atom in the molecule (in particular, polysiloxane polymer having at least two silicon atoms having an Si—H bond in the molecule).

The amount of the polysiloxane polymer having at least two silicon atoms having an Si—H bond in the molecule is not specifically defined. For example, it falls within the range of the amount of the polysiloxane polymer to be in the releasable liner mentioned hereinabove. When the polysiloxane polymer having at least two alkenyl groups in the molecule is cured by the action thereon of the polysiloxane polymer having at least two silicon atoms having an Si—H bond in the molecule (crosslinking agent), a catalyst may be used like in the releasable liner mentioned above. Its amount is not specifically defined, and may be selected from the range for the releasable liner mentioned above.

For the polysiloxane-type release agent for use herein, preferred is a polydimethylsiloxane release agent that comprises a polydimethylsiloxane polymer having at least two vinyl groups, as alkenyl groups, in the molecule, and a polydimethylhydrogensiloxane polymer having at lest two monomer units of —Si (R) (H)O— (wherein R indicates a hydrocarbon group) in the molecule, line in the releasable liner mentioned above.

The polysiloxane release agent may be prepared in the same manner as that for the releasable liner mentioned above. In the polysiloxane release agent, the polymer component such as the polysiloxane polymer may be dissolved in an organic solvent. If desired, the polysiloxane release agent may contain known or conventional additives (e.g., filler, antistatic agent, antioxidant, UV absorbent, plasticizer, colorant (e.g., dye, pigment)).

Like in the releasable liner mentioned above, commercially-available polysiloxane release agents may also be used herein.

The release layer for the holes-having releasable substrate (such as the periphery-thickened holes-having releasable substrate) may be formed in the same manner as that for the releasable liner mentioned above. Like that for the releasable liner, the release layer may be formed in any known or conventional heating method (for example, with a hot-air drier). It is important that the amount of the release agent is suitably controlled. Regarding the suitable amount of the release agent, referred to is the same as that mentioned hereinabove for the releasable liner. If the amount of the release agent used is too small, then the releasing force (force necessary for release) will increase and it is problematic in practical use; but on the other hand, if the amount is too large, it is expensive and is therefore uneconomical.

The thickness of the holes-having releasable substrate such as the periphery-thickened holes-having releasable substrate, the thickness of the substrate alone and the thickness of the release layer are not specifically defined, and may be suitably determined depending on the profile and the pattern of the projected spots of fibers to be formed on the pressure-sensitive adhesive layer of the pressure-sensitive adhesive tape or sheet of the invention.

The holes-having releasable substrate such as the periphery-thickened holes-having releasable substrate has holes. The holes are utilized in forming projected spots of fibers in the surface of a pressure-sensitive adhesive layer. Therefore, it is important that the holes are formed in the sites that correspond to the sites of the projected spots of fibers to be formed in the surface of a pressure-sensitive adhesive layer. Accordingly, when the holes-having releasable substrate is used, then the intended projected spots of fibers may be formed in the sites of the surface of the pressure-sensitive adhesive layer that correspond to the holes of the holes-having releasable substrate. Therefore, depending on the position at which the holes are formed in the releasable substrate, and on the size and the number of the holes, the position at which the projected spots of fibers are formed in the surface of a pressure-sensitive adhesive layer, as well as the size and the number of the projected spots of fibers to be formed may be controlled.

Further, for the periphery-thickened holes-having releasable substrate as a type of the holes-having releasable substrate, it is important that the peripheral region around the holes is thickened, as swelling toward the side of one face alone. To that effect, the peripheral region around the holes is thickened in one direction, and the projected spots of fibers formed in the surface of a pressure-sensitive adhesive layer may be thereby effectively protected with the releasable substrate. Concretely, since the peripheral region around the holes are thickened, the fibers of forming the projected spots may be effectively protected with the releasable substrate even through they are long. Accordingly, long fibers may be used for forming the projected spots. In this connection, longer fibers having the same composition are more inexpensive. In the invention, therefore, the cost of the fibers to be used may be reduced, and, in addition, a larger variety of fibers may be employable herein.

Fibers of the same length are compared, when they are in the holes of the invention. Since the peripheral region around the holes is thickened in the releasable substrate of the invention, the fibers to constitute the projected spots in the holes may stand (or are raised) more vertically relative to the surface of the pressure-sensitive adhesive layer to which the fibers are fixed, and they may be more effectively protected with the releasable substrate while they are kept standing more vertically. Accordingly, when fibers of the same length are used in flocking the surface of a pressure-sensitive adhesive layer by the use of the periphery-thickened holes-having releasable substrate or by the use of the holes-having releasable substrate in which the peripheral region around the holes is not thickened, then the pressure-sensitive adhesive tape or sheet produced by the use of the former periphery-thickened holes-having releasable substrate may enjoy much better reworkability and repositionability than that produced by the use of the latter substrate. It is desirable that the fibers of the projected spots in the surface of a pressure-sensitive adhesive layer are fitted to the surface thereof to rise (stand) from it as vertically as possible relative to the surface of the pressure-sensitive adhesive layer, for better reworkability and repositionability of the pressure-sensitive adhesive tape or sheet that has the projected spots of the fibers.

Moreover, in the periphery-thickened holes-having releasable substrate, since only the peripheral region around the holes is thickened, the thickness of the releasable substrate itself (the thickness of the substrate except the holes and the peripheral region therearound) is not large, and therefore the periphery-thickened holes-having releasable substrate may be kept flexible. Accordingly, the periphery-thickened holes-having releasable substrate can be well handled. In addition, since the peripheral region around the holes swells toward the side of one face alone, the other surface may be a flat release face that does not swell, and it may be effectively utilized as a release face relative to the pressure-sensitive adhesive face of a pressure-sensitive adhesive layer. When both surfaces of the periphery-thickened holes-having releasable substrate are release faces, then the peripheral region around the holes swells toward the side of any one face alone; and when only one surface of the periphery-thickened holes-having releasable substrate is a release face, then the peripheral region around the holes swells toward the side of the face alone that is not the release face.

In the periphery-thickened holes-having releasable substrate, the thickness of the thickened wall of the peripheral region around the holes is not specifically defined, but is preferably same as or larger than the height of the projected spots of fibers to be formed in the surface of a pressure-sensitive adhesive layer. In particular, when the fibers of the projected spots stand vertically to the surface of a pressure-sensitive adhesive layer to which they are adhered, it is desirable that the thickness of the thickened wall of the peripheral region around the holes is same as or larger than the height of the projected spots of the vertically-standing fibers (that is, the length of the fibers). Concretely, the thickness of the thickened wall of the peripheral region around the holes in the periphery-thickened holes-having releasable substrate may be from 1.5 to 6 times (preferably from 2 to 4 times) the thickness of the non-thickened site of the substrate.

The range of the thickened area of the peripheral region around the holes in the periphery-thickened holes-having releasable substrate is not specifically defined. For example, when the holes are circular, having a diameter of 0.8 mm in the surface of the periphery-thickened holes-having releasable substrate, then the peripheral region around the holes (thickened region) may fall between 0.01 and 0.5 mm (preferably between 0.03 and 0.1 mm) from the edge of the hole.

For forming the holes in the holes-having releasable substrate, various methods may be employed like those for forming the recesses in the releasable liner mentioned hereinabove. For example, one comprises perforation with a known or conventional hole-forming machine [especially, a perforator having a projected structure of various forms and a recessed structure corresponding to the projected structure]; another comprises perforation under heat or light (for example, with thermal head, halogen lamp, xenon lamp, flash lamp, laser or the like); and still another comprises molding with a mold (for example, a mold with projections). According to the perforation method (e.g., perforation with a perforator, or perforation under heat or light), a releasable substrate not having holes is perforated to give a holes-having releasable substrate (perforated releasable substrate). For the releasable substrate not having holes (releasable substrate not as yet perforated and therefore not having holes), known releasable liners such as those mentioned hereinabove may be used.

Figure 10:
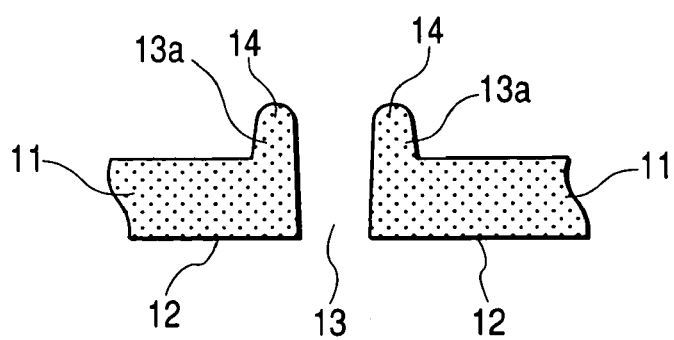
FIG. 10 is a schematic cross-sectional view showing the molten ring around the perforation formed in a perforation technique.

For forming holes in a releasable substrate to give the holes-having releasable substrate, the method of perforation is preferred from the following viewpoints: The method is inexpensive; the sites at which the holes are to be formed may be readily changed and controlled; known releasable liners may be used for producing the holes-having releasable substrates. In particular, when releasable substrates of plastics (e.g., releasable liners of plastics) are perforated according to the perforation method for forming perforations therein, then perforations and swelling peripheries around them are readily formed in the substrates. Accordingly, for forming perforations to produce periphery-thickened holes-having releasable substrates, the perforation method is preferred. Concretely, a releasable substrate of plastic is perforated at a temperature lower than the melting point of the plastic substrate but not lower than a temperature of (melting point −30° C.) [preferably not higher than a temperature of (melting point −3° C.) and not lower than a temperature of (melting point −20° C.), more preferably not higher than a temperature of (melting point −5° C.) and not lower than a temperature of (melting point −15° C.)], whereby burrs (molten rings) are formed in the perforation direction and along the perforations formed, as in FIG. 10, and the molten rings may serve as the swelling walls around the perforations. FIG. 10 is a schematic cross-sectional view showing the molten ring around the perforation formed in a perforation technique. In FIG. 10, 11 is a releasable substrate of plastic; 12 is a release face; 13 is a perforation; 13a is a peripheral region around the perforation; 14 is a molten ring.

Figure 11:
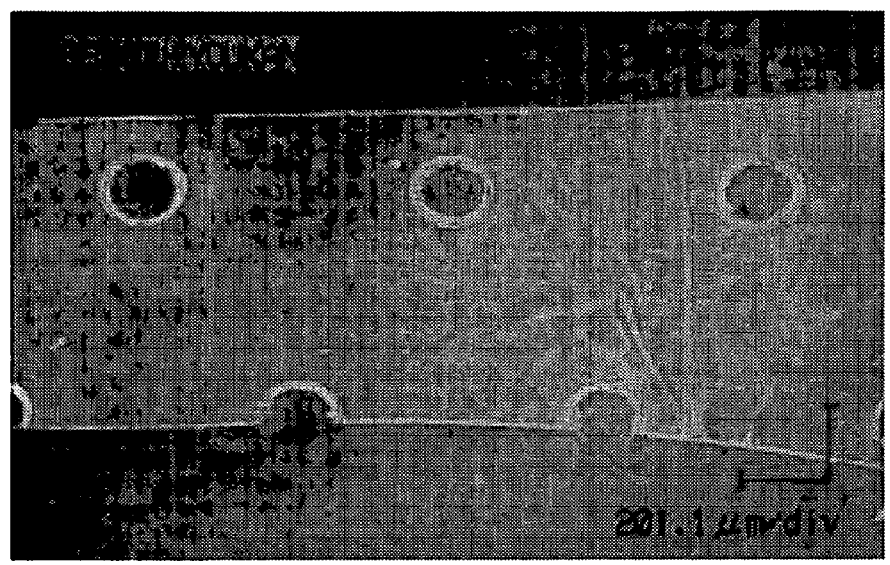
FIG. 11 is a diagram based on a photograph showing the profile of the molten rings formed in the peripheral region around the holes in a periphery-thickened holes-having releasable substrate, and this is seen on the top of the substrate.
Figure 12:
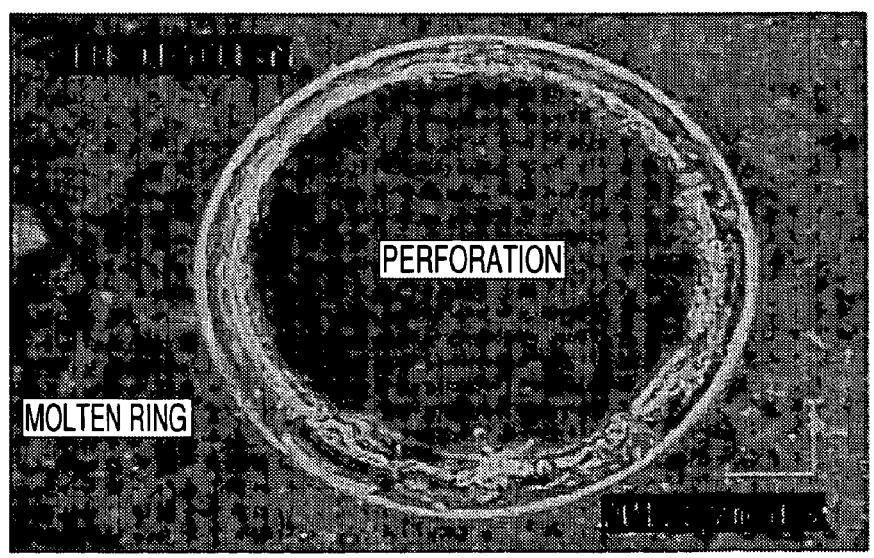
FIG. 12 is a diagram based on a photograph showing the profile of the molten ring formed in the peripheral region around the hole in the periphery-thickened holes-having releasable substrate of FIG. 11, and this is a partly enlarged view of FIG. 11 seen on the top of the molten ring.
Figure 13:
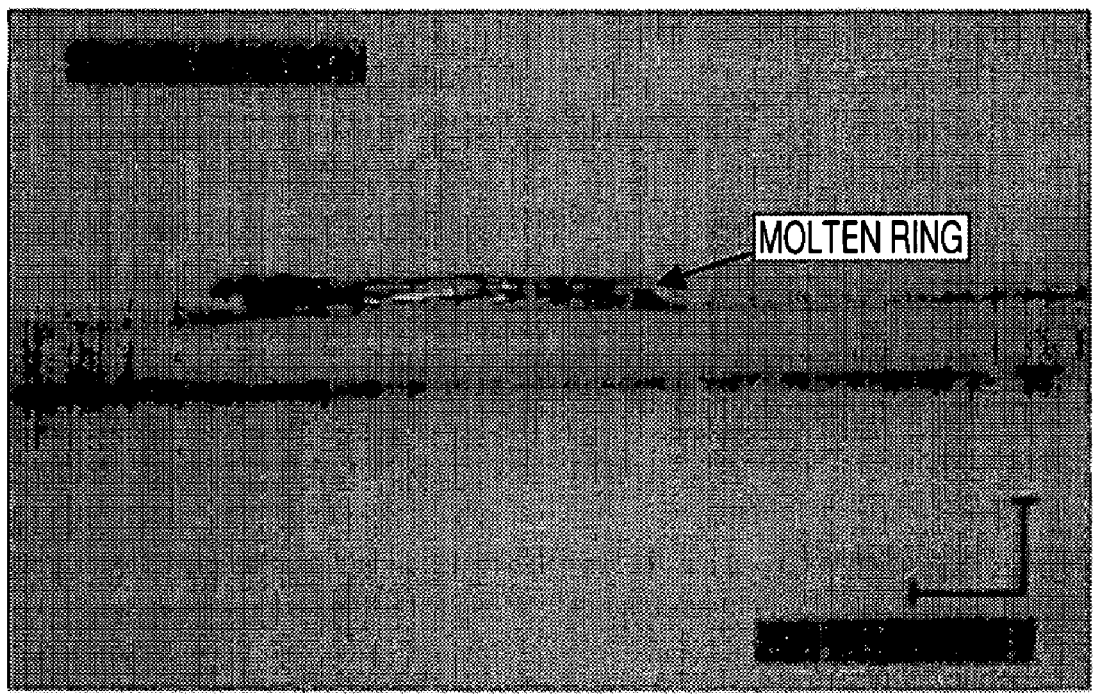
FIG. 13 is a diagram based on a photograph showing the profile of the molten ring formed in the peripheral region around the hole in the periphery-thickened holes-having releasable substrate of FIG. 11, and this is a partly enlarged view of FIG. 11 seen on the side of the molten ring.

FIGS. 11 to 13 are diagrams based on photographs showing the profile of the molten rings formed in the peripheral region around the holes in a periphery-thickened holes-having releasable substrate. FIG. 11 is a diagram based on a photograph showing the profile of the molten rings formed in the peripheral region around the holes in a periphery-thickened holes-having releasable substrate, and this is seen on the top of the substrate. FIG. 12 is a diagram based on a photograph showing the profile of the molten ring formed in the peripheral region around the hole in the periphery-thickened holes-having releasable substrate of FIG. 11, and this is a partly enlarged view of FIG. 11 seen on the top of the molten ring. FIG. 13 is a diagram based on a photograph showing the profile of the molten ring formed in the peripheral region around the hole in the periphery-thickened holes-having releasable substrate of FIG. 11, and this is a partly enlarged view of FIG. 11 seen on the side of the molten ring. The periphery-thickened holes-having releasable substrate in FIGS. 11 to 13 is produced by perforating a double-release-treated, polyethylene terephthalate film having a thickness of 38 μm, and in this, a molten ring is formed around every perforation. In the periphery-thickened holes-having releasable substrate of these diagrams, the diameter of each perforation is about 0.8 mm, and the height of the molten ring is about 80 μm.

The height of the molten ring (the height of the swollen edge) generally corresponds to a height of from 0.5 to 5 times (preferably from 1 to 3 times) the thickness of the original plastic substrate not perforated (that is, the thickness of the site of the substrate not having the molten rings).

For the holes-having releasable substrate such as the periphery-thickened holes-having releasable substrate of the invention, for example, holes-having releasable liners (especially, perforations-having releasable liners) such as those mentioned hereinabove may be employed. Above all, holes-having (especially, perforation-having) releasable liners (releasable films) of plastics are preferred.

In the method of using the holes-having releasable substrate for producing the pressure-sensitive adhesive tape or sheet having projected spots of fibers partly in the surface of the pressure-sensitive adhesive layer thereof, the sites in which the projected spots of fibers are to be formed in the surface of the pressure-sensitive adhesive layer, and the size and the number of the projected spots of fibers may be controlled by controlling the sites of the holes to be formed in the releasable substrate and the size and the number of the holes.

The holes-having releasable substrate (especially the periphery-thickened holes-having releasable substrate) of the invention may be used in forming the projected spots of fibers (especially the raised spots of fibers) partly in the surface of the pressure-sensitive adhesive layer of the pressure-sensitive adhesive tape or sheet, as so mentioned hereinabove. For forming the projected spots of fibers partly in the surface of the pressure-sensitive adhesive layer of the pressure-sensitive adhesive tape or sheet by the use of the holes-having releasable substrate, especially preferred is the above-mentioned flocking method (in particular, electrostatic flocking method). Concretely, the periphery-thickened holes-having releasable substrate is stuck to a pressure-sensitive adhesive layer in such a manner that the flat release face with no swollen hills (flat release face) of the substrate faces the surface of the pressure-sensitive adhesive layer, and the surface of the pressure-sensitive adhesive layer is flocked (especially, electrostatically flocked) in that condition, whereby the intended projected spots of fibers maybe formed in the sites of the surface of the pressure-sensitive adhesive layer corresponding to the holes of the periphery-thickened holes-having releasable substrate. Accordingly, it is important that the periphery-thickened holes-having releasable substrate have the holes (holes each surrounded by a thickened hill at the peripheral region thereof) in the sites corresponding to the predetermined sites where the projected spots of fibers are to be formed in the surface of the pressure-sensitive adhesive layer, as so mentioned hereinabove.

When the pressure-sensitive adhesive layer is protected with a releasable liner having no holes, then the liner is peeled off, and a holes-having releasable substrate such as periphery-thickened holes-having releasable substrate is stuck to the surface of the pressure-sensitive adhesive layer (when the holes-having releasable substrate is a periphery-thickened holes-having releasable substrate, then it is stuck thereto so that the flat release face of the substrate faces the surface of the pressure-sensitive adhesive layer), and thereafter the surface of the pressure-sensitive adhesive layer is flocked in that condition, whereby the intended projected spots of fibers can be formed in the predetermined sites (corresponding to the holes of the holes-having releasable substrate) of the surface of the pressure-sensitive adhesive layer.

The holes-having releasable substrate (e.g., periphery-thickened holes-having releasable substrate) may be peeled off after the projected spots of fibers have been formed, but it is desirable that the substrate is left as such and is used as a releasable liner. Accordingly, for example, one preferred method for producing the pressure-sensitive adhesive tape or sheet having projected spots of fibers partly in the surface of the pressure-sensitive adhesive layer thereof comprises applying a holes-having releasable substrate (especially, periphery-thickened holes-having releasable substrate) to the surface of a pressure-sensitive adhesive layer followed by flocking the surface of the pressure-sensitive adhesive layer in that condition to thereby form the intended projected spots of fibers in the sites of the surface of the pressure-sensitive adhesive layer corresponding to the holes of the holes-having releasable substrate.

When the holes-having releasable substrate is peeled off after the formation of the projected spots of fibers, the surface of the pressure-sensitive adhesive layer having the projected spots of fibers formed therein may be protected with a recesses-having releasable liner (especially, releasable liner that has recesses in the sites corresponding to the projected spots of fibers formed in the surface of the pressure-sensitive adhesive layer).

Figure 15:
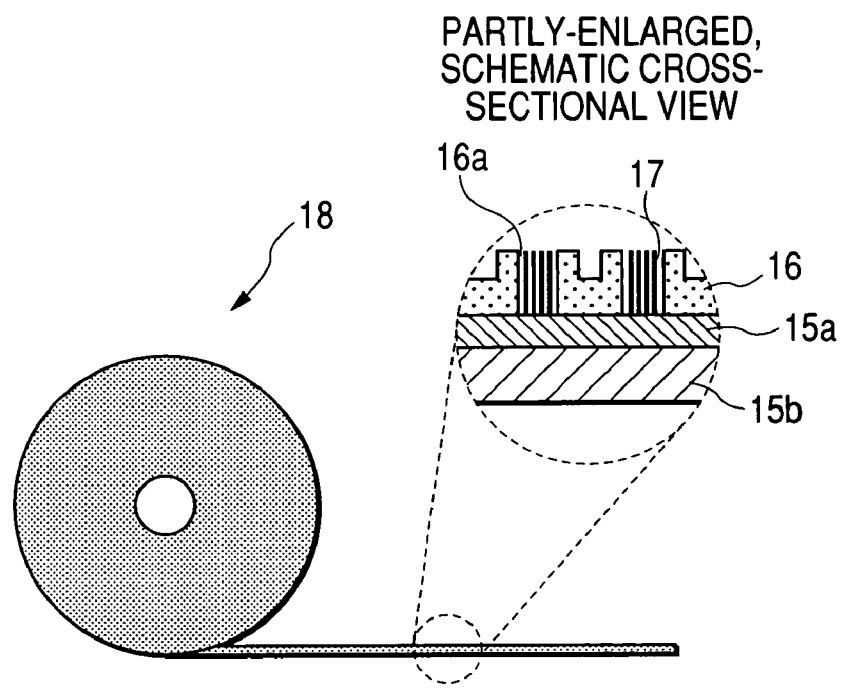
FIG. 15 is a schematic view of a pressure-sensitive adhesive tape (roll) that has raised spots of fibers on one surface of the pressure-sensitive adhesive layer thereof and is wound up into a roll.

FIGS. 14A and 14B each shows one example of the pressure-sensitive adhesive tape or sheet of the invention, which has projected spots of fibers in the surface of the pressure-sensitive adhesive layer and which is produced through flocking by the use of a periphery-thickened holes-having releasable substrate. FIGS. 14A and 14B are schematic views partly showing one example of the pressure-sensitive adhesive tape or sheet of the invention, and FIG. 14A is a schematic plan view of the pressure-sensitive adhesive tape or sheet seen on its top, and FIG. 14B is a schematic cross-sectional view of FIG. 14A cut along the line X'-Y'. In FIGS. 14A and 14B, 15 is a pressure-sensitive adhesive tape or sheet; 15a is a pressure-sensitive adhesive layer; 15a1 is the surface of the pressure-sensitive adhesive layer 15a; 15b is a substrate for pressure-sensitive adhesive tape or sheet (this may be hereinafter simply referred to as "substrate"); 16 is a periphery-thickened holes-having releasable substrate; 16a is a perforation of the periphery-thickened holes-having releasable substrate 16; 16a1 is the peripheral region around the perforation 16a; 16b is a swollen hill; 16c is a thickened wall; 17 is a raised part of fibers. The constitution of the pressure-sensitive adhesive tape or sheet 15 is as follows: A pressure-sensitive adhesive layer 15a is formed on one surface of the substrate 15b that serves as a support; a periphery-thickened holes-having releasable substrate 16 is laminated on the pressure-sensitive adhesive layer 15a; and the surface 15a1 of the pressure-sensitive adhesive layer 15a has raised spots of fibers 17, a type of projected spots of fibers that are formed in the sites thereof corresponding to the perforations 16a of the periphery-thickened holes-having releasable substrate 16.

In FIG. 14A, the raised spots of fibers 17 are so positioned that they form multiple lines as a whole, like in FIG. 1A. The distance between the adjacent lines (the distance between the center parts of the adjacent lines) is 10 mm, and the distance between the raised spots of fibers that are in one line (the distance between the center parts of the adjacent raised spots of fibers) is 10 mm. Regarding the profile of one raised spot of fibers in the surface of the pressure-sensitive adhesive layer, the part is almost circular, having a radius of about 0.5 mm (and having an area of about 0.8 mm$^2$). The adjacent lines of the raised spots of fibers are so designed that the raised spots of fibers in one line are formed at the sites each corresponding to the center part of the adjacent raised spots of fibers in the other line.

The pressure-sensitive adhesive tape or sheet thus produced by the use of the periphery-thickened holes-having releasable substrate may be wound up into a coil or roll in the same manner as hereinabove, for example, as in FIG. 15; or the pressure-sensitive adhesive sheet may be in one layer or in multiple layers piled up. FIG. 15 shows a schematic view of a roll of pressure-sensitive adhesive tape. In this, the pressure-sensitive adhesive tape has raised spots of fibers on one surface of the pressure-sensitive adhesive layer, and this is wound up into a roll. In FIG. 15, 18 is a roll of pressure-sensitive adhesive tape; and 15a, 15b, 16, 16a and 17 have the same meanings as above. In FIG. 15, the view in the dotted circle is a partly-enlarged cross-sectional view of the pressure-sensitive adhesive tape. In the pressure-sensitive adhesive tape or sheet thus produced by the use of the periphery-thickened holes-having releasable substrate, the periphery-thickened holes-having releasable substrate may be left as such so that it may serves as a releasable liner to protect the pressure-sensitive adhesive face of the pressure-sensitive adhesive layer and also the projected spots of fibers formed in the pressure-sensitive adhesive face thereof. In addition, even when the fibers in the projected spots stand vertically (rise vertically), the periphery-thickened holes-having releasable substrate can effectively protect the fibers while they are kept vertically standing or rising as they are. Accordingly, in the pressure-sensitive adhesive tape or sheet produced by the use of the periphery-thickened holes-having releasable substrate, the periphery-thickened holes-having releasable substrate may serve directly as a releasable liner, and the pressure-sensitive adhesive tape or sheet thus having the releasable substrate therein may be wound up into rolls or coils.

The pressure-sensitive adhesive tape or sheet of the invention has projected spots of fibers formed partly in the surface of the pressure-sensitive adhesive layer. As so mentioned hereinabove, therefore, this may be applied to an adherend and temporarily adhered thereto by giving a small load thereto. The temporarily-adhered tape or sheet may be readily reworked or repositioned. In other words, the pressure-sensitive adhesive tape or sheet of the invention has good reworkability and repositionability.

Accordingly, the pressure-sensitive adhesive tape or sheet of the invention is favorable for those that require reworking or repositioning after temporary adhesion. In particular, the pressure-sensitive adhesive tape or sheet is especially favorable for flooring material fixation (as pressure-sensitive adhesive tape or sheet for flooring). When the pressure-sensitive adhesive tape or sheet is used for flooring material fixation, it is preferably a substrate-supported double-sided pressure-sensitive adhesive tape or sheet that has a pressure-sensitive adhesive layer on both surfaces of the substrate and has projected spots of fibers partly in the surface of the pressure-sensitive adhesive layer on one surface of the substrate [that is, substrate-supported double-sided pressure-sensitive adhesive tape or sheet that has, on one surface of the substrate, a pressure-sensitive adhesive layer with projected spots of fibers partly formed in its surface (pressure-sensitive adhesive layer having projected spots of fibers), and has, on the other surface of the substrate, a pressure-sensitive adhesive layer not having projected spots of fibers in its surface (pressure-sensitive adhesive layer not having projected spots of fibers)].

For adhering a flooring material to a floor base by the use of the pressure-sensitive adhesive tape or sheet of the invention, the method is not specifically defined. For example, the following method is preferred.

<Method of Adhering Flooring Material to Floor Base>

As the pressure-sensitive adhesive tape or sheet, for example, used is a substrate-supported double-sided pressure-sensitive adhesive tape or sheet that has, on one surface of the substrate, a pressure-sensitive adhesive layer having projected spots of fibers, and has, on the other surface of the substrate, a pressure-sensitive adhesive layer not having projected spots of fibers. This is fitted to a flooring material in such a manner that its pressure-sensitive adhesive face on the side of the pressure-sensitive adhesive layer not having projected spots of fibers faces the flooring material, and then the thus-processed flooring material is inserted into a predetermined area on a floor base, and the pressure-sensitive adhesive face of the pressure-sensitive adhesive layer that has projected spots of fibers formed thereon is temporarily adhered to the floor base. With that, the flooring material is moved to a predetermined area on the floor base, and then pressed strongly so as to be adhered to the floor base via the pressure-sensitive adhesive tape or sheet therebetween.

The pressure-sensitive adhesive tape or sheet of the invention has good reworkability and repositionability. Therefore, the pressure-sensitive adhesive tape or sheet of the invention is favorable for flooring material fixation.

When the releasable substrate of the invention is used, it is possible to produce the pressure-sensitive adhesive tape or sheet of good reworkability and repositionability. In particular, the pressure-sensitive adhesive tape or sheet thus produced by the use of the releasable substrate of the invention is especially favorable for flooring material fixation.

The invention is described in more detail with reference to the following Examples, to which, however, the invention should not be limited. In the following Examples and Comparative Examples, the samples were flocked in a box (size: 2.5 m in length in the line flow direction ×1.3 m in width ×1.4 m in height) provided with a line on which a negatively-charged long sheet is run from one side to the other side thereof while sprayed with positively-charged fibers introduced into the box. Concretely, fibers were sprayed into the box from one upper hole formed in the box at a voltage of 30 kV applied thereto, and a long sheet is, while run on the line at a line speed of 5 m/min with its face to be flocked being upward, electrostatically flocked with the sprayed fibers.

EXAMPLE 1

A heptane solution of 1 wt. % polydimethylsiloxane-type silicone release agent (trade name, KS-778 by Shin-etsu Chemical) was applied to both surfaces of a polyester film (trade name, Lumirror #38 by Toray, having a thickness of 38 μm), and then dried at 120° C. for 2 minutes to produce a releasable liner (releasable paper—this may be hereinafter referred to as "releasable liner A1"). In this releasable liner A1, the amount of the silicone release agent was 0.05 g/m$^2$.

Figure 16:
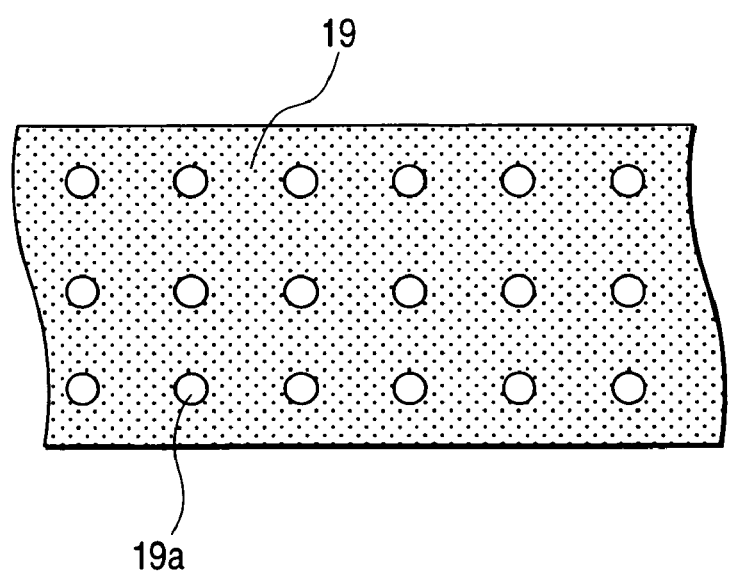
FIG. 16 is a schematic view showing a perforated releasable liner.

Using a perforator (300-W laboratory embossing machine, by Yuri Roll) of which the projections and recesses are so designed that they may form perforations each having an area of 0.8 mm$^2$ at intervals of 10 mm, the releasable liner A1 was perforated to have a pattern of perforations as in FIG. 16. Thus processed, the releasable liner A1 may be hereinafter referred to as "perforated releasable liner A1". In the perforated releasable liner A1, the mean perforation area of each perforation was 0.8 mm$^2$, and the overall perforation area of all the perforations was 0.8% of the overall surface area of the liner. FIG. 16 is a schematic view showing a perforated releasable liner. In FIG. 16, 19 is a perforated releasable liner, and 19a is a perforation.

On the other hand, a heptane solution of 1 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B1"). The release face of the releasable liner B1 was then coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer A1") A polyester nonwoven fabric (this may be hereinafter referred to as "substrate A1") was stuck to the surface of the pressure-sensitive adhesive layer A1, and then the surface of the substrate A1 (polyester nonwoven fabric) was coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer B1"). Next, the perforated releasable liner A1 was stuck to the surface of the pressure-sensitive adhesive layer B1. Next, using polyamide fibers (thickness, 1.5 deniers; length, 0.3 mm), this was electrostatically flocked on the surface of the perforated releasable liner A1 thereof, whereby the polyamide fibers were planted in the sites of the pressure-sensitive adhesive layer B1 corresponding to the perforations of the perforated releasable liner A1. As a result, the process gave a double-sided pressure-sensitive adhesive sheet that has raised spots of fibers in the surface of one pressure-sensitive adhesive layer thereof, as in FIG. 17 (this may be hereinafter referred to as "double-sided pressure-sensitive adhesive sheet A1"). Specifically, the double-sided pressure-sensitive adhesive sheet A1 has a layer constitution of "releasable liner B1/pressure-sensitive adhesive layer A1/substrate A1/pressure-sensitive adhesive layer Bi having raised spots of fibers on its surface/ perforated releasable liner A1".

Figure 17:
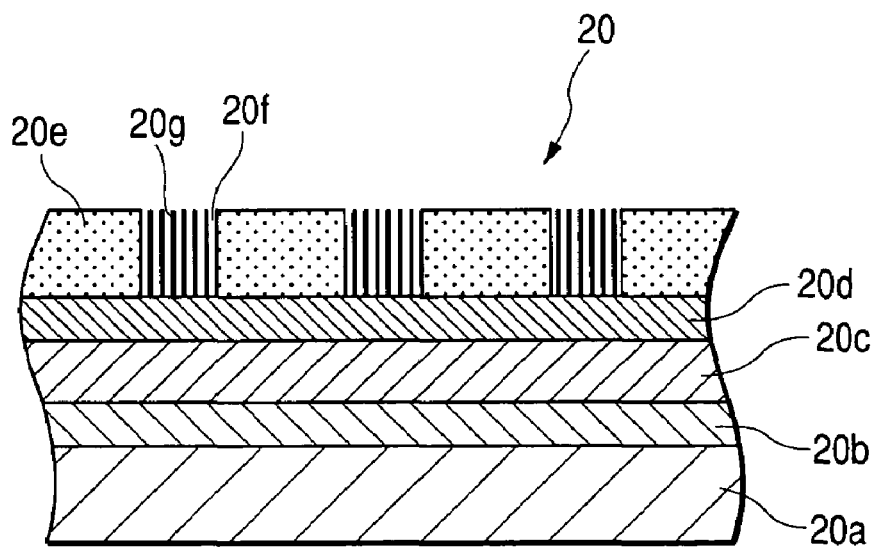
FIG. 17 is a schematic cross-sectional view showing a pressure-sensitive adhesive sheet that has raised spots of fibers in the surface of one pressure-sensitive adhesive layer thereof.

FIG. 17 is a schematic cross-sectional view showing a double-sided pressure-sensitive adhesive sheet that has raised spots of fibers in the surface of one pressure-sensitive adhesive layer thereof. In FIG. 17, 20 is a double-sided pressure-sensitive adhesive sheet; 20a is a releasable liner; 20b is a pressure-sensitive adhesive layer; 20c is a substrate; 20d is a pressure-sensitive adhesive layer having raised spots of fibers in its surface; 20e is a perforated releasable liner; 20f is a perforation of the releasable liner 20e; 20g is a raised spot of fibers in the surface of the pressure-sensitive adhesive layer 20d.

EXAMPLE 2

A heptane solution of 8.0 wt. % polydimethylsiloxane-type silicone release agent (trade name, KS-837 by Shin-etsu Chemical) was applied to both surfaces of a polyethylene film (trade name, NSO by Ohkura Industry, having a thickness of 60 μm), and then dried at 120° C. for 2 minutes to produce a releasable liner (releasable paper—this may be hereinafter referred to as "releasable liner A2"). In this releasable liner A2, the amount of the silicone release agent was 0.6 g/m$^2$.

Using the same perforator as in Example 1, of which, however, the projections and recesses are so designed that they may form perforations each having an area of 1 mm$^2$ at intervals of 5 mm, the releasable liner A2 was perforated to have a pattern of perforations like in Example 1. Thus processed, the releasable liner A2 may be hereinafter referred to as "perforated releasable liner A2". In the perforated releasable liner A2, the mean perforation area of each perforation was 1.0 mm$^2$, and the overall perforation area of all the perforations was 4% of the overall surface area of the liner.

On the other hand, a heptane solution of 1 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B2"). The release face of the releasable liner B2 was then coated with a rubber pressure-sensitive adhesive (this comprises natural rubber and styrene-butadiene rubber in a ratio of natural rubber/styrene-butadiene rubber=50/50 by weight) to form thereon a pressure-sensitive adhesive layer having a dry thickness of 20 μm (this may be hereinafter referred to as "pressure-sensitive adhesive layer A2"). A polyester nonwoven fabric (this may be hereinafter referred to as "substrate A2") was stuck to the surface of the pressure-sensitive adhesive layer A2, and then the surface of the substrate A2 (polyester nonwoven fabric) was coated with a rubber pressure-sensitive adhesive (this comprises natural rubber and styrene-butadiene rubber in a ratio of natural rubber/styrene-butadiene rubber=50/50 by weight) to form thereon a pressure-sensitive adhesive layer having a dry thickness of 20 μm (this may be hereinafter referred to as "pressure-sensitive adhesive layer B2"). Next, the perforated releasable liner A2 was stuck to the surface of the pressure-sensitive adhesive layer B2. Next, using cotton fibers (thickness, 1.5 deniers; length, 1.0 mm), this was electrostatically flocked on the surface of the perforated releasable liner A2 thereof, whereby the cotton fibers were planted in the sites of the pressure-sensitive adhesive layer B2 corresponding to the perforations of the perforated releasable liner A2. As a result, the process gave a double-sided pressure-sensitive adhesive sheet that has raised spots of fibers in the surface of one pressure-sensitive adhesive layer thereof (this may be hereinafter referred to as "double-sided pressure-sensitive adhesive sheet A2"), like in Example 1. Specifically, the double-sided pressure-sensitive adhesive sheet A2 has a layer constitution of "releasable liner B2/pressure-sensitive adhesive layer A2/substrate A2/pressure-sensitive adhesive layer B2 having raised spots of fibers on its surface/perforated releasable liner A2".

EXAMPLE 3

A heptane solution of 1 wt. % polydimethylsiloxane-type silicone release agent (trade name, KS-778 by Shin-etsu Chemical) was applied to both surfaces of a polyester film (trade name, Lumirror #38 by Toray, having a thickness of 38 μm), and then dried at 120° C. for 2 minutes to produce a releasable liner (releasable paper—this may be hereinafter referred to as "releasable liner A3"). In this releasable liner A3, the amount of the silicone release agent was 0.1 g/m$^2$.

Using the same perforator as in Example 1, of which, however, the projections and recesses are so designed that they may form perforations each having an area of 1.5 mm$^2$ at intervals of 20 mm, the releasable liner A3 was perforated to have a pattern of perforations like in Example 1. Thus processed, the releasable liner A3 may be hereinafter referred to as "perforated releasable liner A3". In the perforated releasable liner A3, the mean perforation area of each perforation was 1.5 mm$^2$, and the overall perforation area of all the perforations was 0.4% of the overall surface area of the liner.

On the other hand, a heptane solution of 2 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B3"). The release face of the releasable liner B3 was then coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer A3"). A polyester nonwoven fabric (this may be hereinafter referred to as "substrate A3") was stuck to the surface of the pressure-sensitive adhesive layer A3, and then the surface of the substrate A3 (polyester nonwoven fabric) was coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer B3"). Next, the perforated releasable liner A3 was stuck to the surface of the pressure-sensitive adhesive layer B3. Next, using polyamide fibers (thickness, 1.5 deniers; length, 1.0 mm), this was electrostatically flocked on the surface of the perforated releasable liner A3 thereof, whereby the polyamide fibers were planted in the sites of the pressure-sensitive adhesive layer B3 corresponding to the perforations of the perforated releasable liner A3. As a result, the process gave a double-sided pressure-sensitive adhesive sheet that has raised spots of fibers in the surface of one pressure-sensitive adhesive layer thereof (this may be hereinafter referred to as "double-sided pressure-sensitive adhesive sheet A3"), like in Example 1. Specifically, the double-sided pressure-sensitive adhesive sheet A3 has a layer constitution of "releasable liner B3/pressure-sensitive adhesive layer A3/substrate A3/pressure-sensitive adhesive layer B3 having raised spots of fibers on its surface/perforated releasable liner A3".

COMPARATIVE EXAMPLE 1

A double-sided pressure-sensitive adhesive sheet (this may be hereinafter referred to as "double-sided pressure-sensitive adhesive sheet C1") was produced in the same manner as in Example 1, for which, however, the releasable liner was not perforated and the pressure-sensitive adhesive layer were not flocked. Accordingly, the double-sided pressure-sensitive adhesive sheet C1 has a layer constitution of "releasable liner B1/pressure-sensitive adhesive layer A1/substrate A1/pressure-sensitive adhesive layer B1/releasable liner A1".

(Evaluation)

From the double-sided pressure-sensitive adhesive sheets obtained in Examples and Comparative Example (double-sided pressure-sensitive adhesive sheets A1 to A3, and double-sided pressure-sensitive adhesive sheet C1), the perforated releasable liner A1 to A3 (Examples 1 to 3) or the releasable liner A1 (Comparative Example 1) was peeled off. The sheet was temporarily adhered to an acrylic plate with a load of 25 g/22.5 cm$^2$ applied to the side of the other releasable liner. Then, the sheet was moved by 6 mm from its temporarily-adhered site, and then this was strongly pressed to the plate. The repositionability of the sheet was evaluated as to whether or not the sheet was easy to move.

After temporarily adhered, the sheet was left as it was for 24 hours at room temperature (23° C.), and then its adhesive force to the acrylic plate was measured with a Tensilon tensile tester. Based on the ratio of the adhesive force of the sheet thus measured to that of the sheet of Comparative Example 1, the adhesive force of the pressure-sensitive adhesive layer that has raised spots of fibers in its surface was evaluated.

The test data are shown in the columns of "repositionability" and "adhesive force recovery (%)" in Table 1.

TABLE 1

|  | Example | | | Comparative |
| --- | --- | --- | --- | --- |
|  | 1 | 2 | 3 | Example 1 |
| Repositionability | easy to move | easy to move | easy to move | impossible to move |
| Adhesive Force Recovery (%) | 97 | 92 | 95 | 100 |

Table 1 confirms that the pressure-sensitive adhesive sheets of Examples (having raised spots of fibers in the surface of the pressure-sensitive adhesive layer) are easy to move after their temporary adhesion and, after strongly adhered to adherends, their adhesive force is high.

EXAMPLE 4

A heptane solution of 1 wt.% polydimethylsiloxane-type silicone release agent (trade name, KS-778 by Shin-etsu Chemical) was applied to both surfaces of a polyester film (trade name, Lumirror #75 by Toray, having a thickness of 75 μm), and then dried at 120° C. for 2 minutes to produce a releasable substrate (releasable paper—this may be hereinafter referred to as "releasable substrate A4"). In this releasable substrate A4, the amount of the silicone release agent was 0.05 g/m$^2$.

Figure 18:
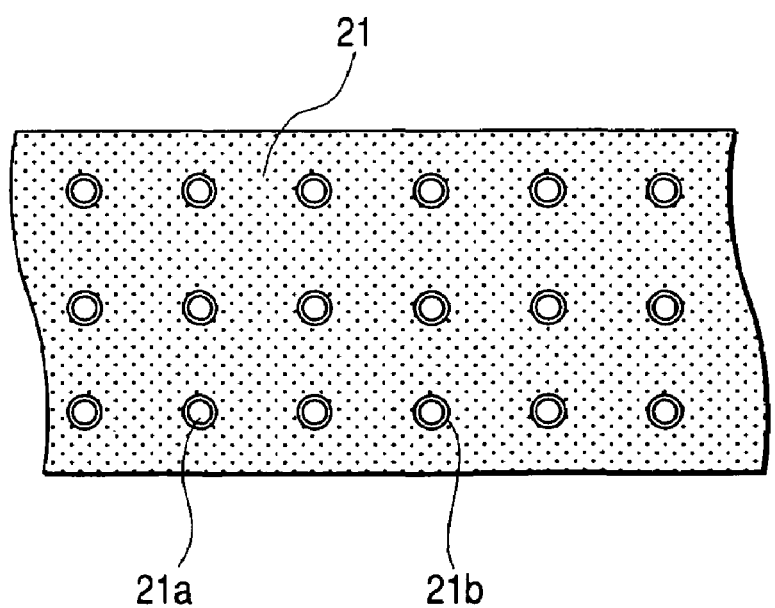
FIG. 18 is a schematic view showing a perforated releasable substrate in which a molten ring is formed around each perforation.

Using a perforator (trade name, HEM1 by Yuri Roll—this is a 300-W laboratory embossing machine) of which the projections and recesses are so designed that they may form perforations each having an area of 0.8 mm$^2$ at intervals of 10 mm, the releasable substrate A4 was perforated to have a pattern of perforations as in FIG. 18. Thus processed, the releasable substrate A4 may be hereinafter referred to as "perforated releasable substrate A4". In the perforated releasable substrate A4, the mean perforation area of each perforation was 0.8 mm$^2$, and the overall perforation area of all the perforations was 0.8% of the overall surface area of the substrate. A molten ring was formed around each perforation, as in FIG. 10 or in FIGS. 11 to 13, and the height of the molten ring was 300 μm. FIG. 18 is a schematic view showing a perforated releasable substrate in which a molten ring is formed around each perforation. In FIG. 18, 21 is a perforated releasable substrate; 21a is a perforation; and 21b is a molten ring.

On the other hand, a heptane solution of 1 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B4"). The release face of the releasable liner B4 was then coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer B4a"). A polyester nonwoven fabric (this may be hereinafter referred to as "substrate B4") was stuck to the surface of the pressure-sensitive adhesive layer B4a, and then the surface of the substrate B4 (polyester nonwoven fabric) was coated with an acrylic pressure-sensitive adhesive (this comprises butyl acrylate-acrylic acid copolymer as the base polymer) to form thereon a pressure-sensitive adhesive layer having a dry thickness of 20 μm (this may be hereinafter referred to as "pressure-sensitive adhesive layer B4b"). Next, the perforated releasable substrate A4 was stuck to the surface of the pressure-sensitive adhesive layer B4b in such a manner that its flat release face with no molten ring could be in contact with the surface of the pressure-sensitive adhesive layer B4b. Next, using polyamide fibers (thickness, 1.5 deniers; length, 0.3 mm), this was electrostatically flocked on the surface of the perforated releasable substrate 4A thereof, whereby the polyamide fibers were planted in the sites of the pressure-sensitive adhesive layer B4b corresponding to the perforations of the perforated releasable substrate A4. As a result, the process gave a double-sided pressure-sensitive adhesive sheet that has raised spots of fibers in the surface of one pressure-sensitive adhesive layer thereof, as in FIG. 19 (this may be hereinafter referred to as "double-sided pressure-sensitive adhesive sheet B4"). Specifically, the double-sided pressure-sensitive adhesive sheet B4 has a layer constitution of "releasable liner B4/pressure-sensitive adhesive layer B4a/substrate B4/pressure-sensitive adhesive layer B4b having raised spots of fibers on its surface/perforated releasable substrate A4".

Figure 19:
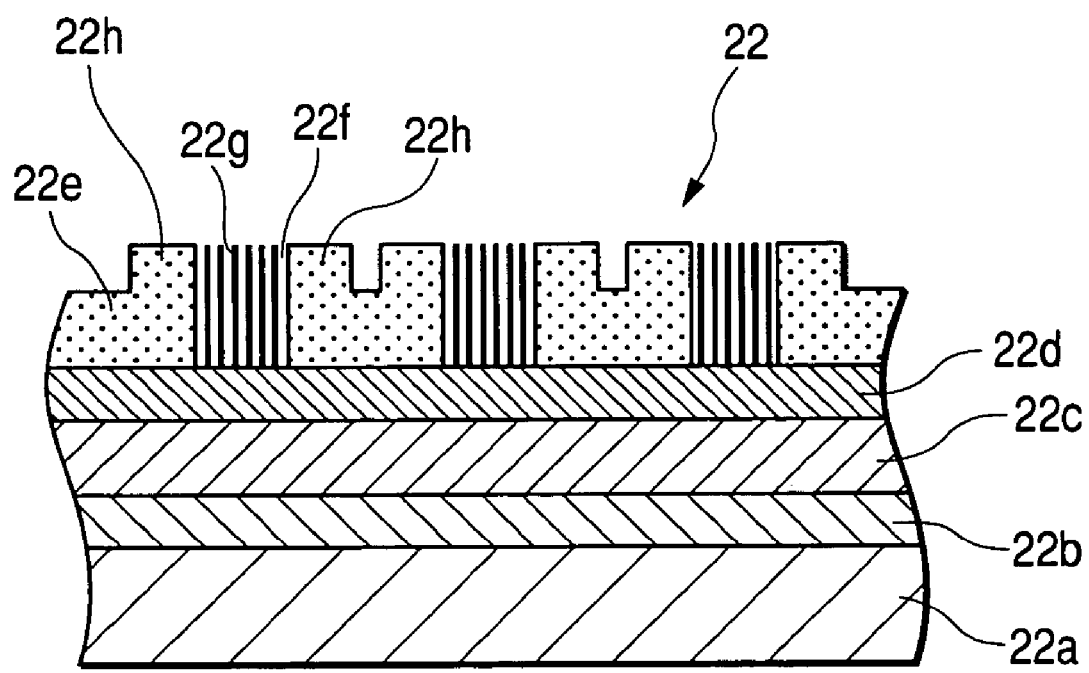
FIG. 19 is a schematic cross-sectional view showing a double-sided pressure-sensitive adhesive sheet that has raised spots of fibers in the surface of one pressure-sensitive adhesive layer thereof.

FIG. 19 is a schematic cross-sectional view showing a double-sided pressure-sensitive adhesive sheet that has raised spots of fibers in the surface of one pressure-sensitive adhesive layer thereof. In FIG. 19, 22 is a double-sided pressure-sensitive adhesive sheet; 22s is a releasable liner; 22b is a pressure-sensitive adhesive layer; 22c is a substrate; 22d is a pressure-sensitive adhesive layer having raised spots of fibers in its surface; 22e is a perforated releasable liner; 22f is a perforation of the releasable liner 22e; 22g is a raised spot of fibers in the surface of the pressure-sensitive adhesive layer 22d; 22h is a molten ring around the perforation 22f.

EXAMPLE 5

A heptane solution of 8.0 wt. % polydimethylsiloxane-type silicone release agent (trade name, KS-837 by Shin-etsu Chemical) was applied to both surfaces of a polyethylene film (trade name, NSO by Ohkura Industry, having a thickness of 60 µm), and then dried at 120° C. for 2 minutes to produce a releasable substrate (releasable paper —this may be hereinafter referred to as "releasable substrate A5"). In this releasable substrate A5, the amount of the silicone release agent was 0.6 g/m$^2$.

Using the same perforator as in Example 4, of which, however, the projections and recesses are so designed that they may form perforations each having an area of 1 mm$^2$ at intervals of 5 mm, the releasable substrate A5 was perforated to have a pattern of perforations like in Example 4. Thus processed, the releasable substrate A5 may be hereinafter referred to as "perforated releasable substrate A5". In the perforated releasable substrate A5, the mean perforation area of each perforation was 1.0 mm$^2$, and the overall perforation area of all the perforations was 4% of the overall surface area of the substrate. A molten ring was formed around each perforation, like in Example 4, and the height of the molten ring was 500 µm.

On the other hand, a heptane solution of 1 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B5"). The release face of the releasable liner B5 was then coated with a rubber pressure-sensitive adhesive (this comprises natural rubber and styrene-butadiene rubber in a ratio of natural rubber/styrene-butadiene rubber=50/50 by weight) to form thereon a pressure-sensitive adhesive layer having a dry thickness of 20 µm (this may be hereinafter referred to as "pressure-sensitive adhesive layer B5a"). A polyester nonwoven fabric (this may be hereinafter referred to as "substrate B5") was stuck to the surface of the pressure-sensitive adhesive layer B5a, and then the surface of the substrate B5 (polyester nonwoven fabric) was coated with a rubber pressure-sensitive adhesive (this comprises natural rubber and styrene-butadiene rubber in a ratio of natural rubber/styrene-butadiene rubber=50/50 by weight) to form thereon a pressure-sensitive adhesive layer having a dry thickness of 20 µm (this may be hereinafter referred to as "pressure-sensitive adhesive layer B5b"). Next, the perforated releasable liner A5 was stuck to the surface of the pressure-sensitive adhesive layer B5b in such a manner that its flat release face with no molten ring could be in contact with the surface of the pressure-sensitive adhesive layer B5b. Next, using cotton fibers (thickness, 1.5 deniers; length, 0.5 mm), this was electrostatically flocked on the surface of the perforated releasable liner A5 thereof, whereby the cotton fibers were planted in the sites of the pressure-sensitive adhesive layer B5b corresponding to the perforations of the perforated releasable liner A5. As a result, the process gave a double-sided pressure-sensitive adhesive sheet that has raised spots of fibers in the surface of one pressure-sensitive adhesive layer thereof (this may be hereinafter referred to as "double-sided pressure-sensitive adhesive sheet B5"), like in Example 4. Specifically, the double-sided pressure-sensitive adhesive sheet B5 has a layer constitution of "releasable liner B5/pressure-sensitive adhesive layer B5a/substrate B5/pressure-sensitive adhesive layer B5b having raised spots of fibers on its surface/perforated releasable substrate A5".

EXAMPLE 6

A heptane solution of 1 wt. % polydimethylsiloxane-type silicone release agent (trade name, KS-778 by Shin-etsu Chemical) was applied to both surfaces of a polyester film (trade name, Lumirror #100 by Toray, having a thickness of 100 µm), and then dried at 120° C. for 2 minutes to produce a releasable substrate (releasable paper—this may be hereinafter referred to as "releasable substrate A6"). In this releasable substrate A6, the amount of the silicone release agent was 0.1 g/m$^2$.

Using the same perforator as in Example 4, of which, however, the projections and recesses are so designed that they may form perforations each having an area of 1.5 mm$^2$ at intervals of 20 mm, the releasable substrate A6 was perforated to have a pattern of perforations like in Example 4. Thus processed, the releasable substrate A6 may be hereinafter referred to as "perforated releasable substrate A6". In the perforated releasable substrate A6, the mean perforation area of each perforation was 1.5 mm$^2$, and the overall perforation area of all the perforations was 0.4% of the overall surface area of the substrate. A molten ring was formed around each perforation, like in Example 4, and the height of the molten ring was 1 mm.

On the other hand, a heptane solution of 2 wt. % polydimethylsiloxane-type silicone release agent (trade name, TPR6600 by GE Toshiba Silicone) was applied onto polyethylene-laminated kraft paper to prepare a releasable liner (this may be hereinafter referred to as "releasable liner B6"). The release face of the releasable liner B6 was then coated with an acrylic pressure-sensitive adhesive (this comprises butyl acrylate-acrylic acid copolymer as the base polymer) to form thereon a pressure-sensitive adhesive layer having a dry thickness of 20 µm (this may be hereinafter referred to as "pressure-sensitive adhesive layer B6a"). A polyester nonwoven fabric (this may be hereinafter referred to as "substrate B6") was stuck to the surface of the pressure-sensitive adhesive layer B6a, and then the surface of the substrate B6 (polyester nonwoven fabric) was coated with an acrylic pressure-sensitive adhesive (this comprises butyl acrylate-acrylic acid copolymer as the base polymer) to form thereon a pressure-sensitive adhesive layer having a dry thickness of 20 µm (this may be hereinafter referred to as "pressure-sensitive adhesive layer B6b"). Next, the perforated releasable substrate A6 was stuck to the surface of the pressure-sensitive adhesive layer B6b in such a manner that its flat release face with no molten ring could be in contact with the surface of the pressure-sensitive adhesive layer B6b. Next, using polyamide fibers (thickness, 1.5 deniers; length, 1.0 mm), this was electrostatically flocked on the surface of the perforated releasable substrate A6 thereof, whereby the polyamide fibers were planted in the sites of the pressure-sensitive adhesive layer B6b corresponding to the perforations of the perforated releasable substrate A6. As a result, the process gave a double-sided pressure-sensitive adhesive sheet that has raised spots of fibers in the surface of one pressure-sensitive adhesive layer thereof (this may be hereinafter referred to as "double-sided pressure-sensitive adhesive sheet B6"), like in Example 4. Specifically, the double-sided pressure-sensitive adhesive sheet B6 has a layer constitution of "releasable liner B6/pressure-sensitive adhesive layer B6a/substrate B6/pressure-sensitive adhesive layer B6b having raised spots of fibers on its surface/perforated releasable substrate A6".

COMPARATIVE EXAMPLE 2

A double-sided pressure-sensitive adhesive sheet (this may be hereinafter referred to as "double-sided pressure-sensitive adhesive sheet C2") was produced in the same manner as in Example 4, for which, however, the releasable substrate was not perforated and the pressure-sensitive adhesive layer were not flocked. Accordingly, the double-sided pressure-sensitive adhesive sheet C2 has a layer constitution of "releasable liner B4/pressure-sensitive adhesive layer B4a/substrate B4/pressure-sensitive adhesive layer B4b/releasable substrate A4".

(Evaluation)

From the double-sided pressure-sensitive adhesive sheets obtained in Examples and Comparative Example (double-sided pressure-sensitive adhesive sheets B4 to B6, and double-sided pressure-sensitive adhesive sheet C2), the perforated releasable substrate A4 to A6 (Examples 4 to 6) or the releasable substrate A4 (Comparative Example 2) was peeled off. The sheet was temporarily adhered to an acrylic plate with a load of 25 g/22.5 cm$^2$ applied to the side of the other releasable liner. Then, the sheet was moved by 6 mm from its temporarily-adhered site, and then this was strongly pressed to the plate. The repositionability of the sheet was evaluated as to whether or not the sheet was easy to move.

After temporarily adhered, the sheet was left as it was for 24 hours at room temperature (23° C.), and then its adhesive force to the acrylic plate was measured with a Tensilon tensile tester. Based on the ratio of the adhesive force of the sheet thus measured to that of the sheet of Comparative Example 2, the adhesive force of the pressure-sensitive adhesive layer that has raised spots of fibers in its surface was evaluated.

The test data are shown in the column of "repositionability" and "adhesive force recovery (%)" in Table 2.

TABLE 2

|  | Example | | | Comparative |
| --- | --- | --- | --- | --- |
|  | 4 | 5 | 6 | Example 2 |
| Repositionability | easy to move | easy to move | easy to move | impossible to move |
| Adhesive Force Recovery (%) | 97 | 92 | 95 | 100 |

Table 2 confirms that the pressure-sensitive adhesive sheets of Examples (having raised spots of fibers in the surface of the pressure-sensitive adhesive layer) are easy to move after their temporary adhesion and, after strongly stuck to adherends, their adhesive force is high.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive tape or sheet having a pressure-sensitive adhesive layer formed on at least one surface of the support thereof, wherein the surface of the pressure-sensitive adhesive layer on at least one surface of the support partly has projected spots of fibers and said surface having the projected spots of fibers is protected with a releasable liner that has recesses at the sites of the surface thereof corresponding to the projected spots of fibers of the pressure-sensitive adhesive layer.

2. The pressure-sensitive adhesive tape or sheet as claimed in claim 1, wherein the projected spots of fibers are raised spots of fibers that are raised from the surface of the pressure-sensitive adhesive layer.

3. The pressure-sensitive adhesive tape or sheet as claimed in claim 1, wherein the recesses of the releasable liner are perforations.

4. The pressure-sensitive adhesive tape or sheet as claimed in claim 1, wherein the projected spots of fibers of the surface of the pressure-sensitive adhesive layer are provided to have a predetermined pattern as a whole.

5. The pressure-sensitive adhesive tape or sheet as claimed in claim 1, wherein the support is a substrate for pressure-sensitive adhesive tape or sheet, the pressure-sensitive adhesive layer is formed on both surfaces of the substrate, and the projected spots of fibers are formed in the surface of the pressure-sensitive adhesive layer on one surface of the substrate.

6. The pressure-sensitive adhesive tape or sheet as claimed in claim 1, wherein the area in which the projected spots of fibers are provided in the surface of the pressure-sensitive adhesive layer is in a ratio of from 0.001 to 20% of all the surface area of the pressure-sensitive adhesive layer.

7. The pressure-sensitive adhesive tape or sheet as claimed in claim 1, wherein the length of the fibers constituting the projected spots is from 0.1 to 5 mm.

8. The pressure-sensitive adhesive tape or sheet as claimed in claim 1, wherein the thickness of the fibers constituting the projected spots is from 0.1 to 20 deniers.

9. The pressure-sensitive adhesive tape or sheet as claimed in claim 1, which is for flooring material fixation.

* * * * *